United States Patent
Jung et al.

(10) Patent No.: US 10,382,691 B2
(45) Date of Patent: Aug. 13, 2019

(54) MOBILE TERMINAL AND CONTROLLING METHOD THEREOF

(71) Applicant: LG ELECTRONICS INC., Seoul (KR)

(72) Inventors: Byungwook Jung, Seoul (KR); Jeeho Hyun, Seoul (KR); Yunhwan Seol, Seoul (KR); Sungbum Joo, Seoul (KR); Seunghwan Kang, Seoul (KR); Jinsool Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 19 days.

(21) Appl. No.: 15/227,364

(22) Filed: Aug. 3, 2016

(65) Prior Publication Data
US 2017/0318226 A1 Nov. 2, 2017

(30) Foreign Application Priority Data

Apr. 28, 2016 (KR) ........................ 10-2016-0052377

(51) Int. Cl.
*H04N 5/232* (2006.01)
*H04N 5/225* (2006.01)
*H04N 5/235* (2006.01)
*H04N 5/247* (2006.01)
*H04N 5/262* (2006.01)
(Continued)

(52) U.S. Cl.
CPC ........... *H04N 5/23293* (2013.01); *G06T 7/11* (2017.01); *G06T 7/55* (2017.01); *H04N 5/2258* (2013.01); *H04N 5/2355* (2013.01); *H04N 5/2356* (2013.01); *H04N 5/23212* (2013.01); *H04N 5/23216* (2013.01); *H04N 5/23232* (2013.01); *H04N 5/232127* (2018.08);

*H04N 5/232935* (2018.08); *H04N 5/247* (2013.01); *H04N 5/265* (2013.01); *H04N 5/2628* (2013.01);
(Continued)

(58) Field of Classification Search
CPC ........... H04N 5/23293; H04N 5/23212; H04N 5/2258; H04N 5/21216; H04N 5/2323; H04N 5/2355; H04N 5/2356; H04N 5/247; H04N 5/2628; H04N 5/44; H04N 5/265; H04N 5/278; G06T 5/003–004; G06T 7/0065; G06T 7/0081; G02B 7/09; G02B 7/102; G02B 7/28–40
USPC ....... 382/255; 359/698; 250/201.6; 352/139, 352/140; 348/345
See application file for complete search history.

(56) References Cited

U.S. PATENT DOCUMENTS

2008/0134102 A1* 6/2008 Movold .................. G06F 3/017
715/863
2009/0015703 A1 1/2009 Kim et al.
(Continued)

FOREIGN PATENT DOCUMENTS

EP 2169946 A2 3/2010
EP 2942936 A1 11/2015
(Continued)

*Primary Examiner* — Xi Wang
(74) *Attorney, Agent, or Firm* — Birch, Stewart, Kolasch & Birch, LLP

(57) ABSTRACT

A mobile terminal including a display; and a controller configured to display a first image including a focusing region and an out-focusing region on the display, wherein a depth of the first image corresponds to a first depth, and display a second image with the out-focusing region adjusted into a second depth in response to a first input signal.

14 Claims, 30 Drawing Sheets

(51) Int. Cl.
*H04N 5/265* (2006.01)
*H04N 5/278* (2006.01)
*H04N 5/44* (2011.01)
*G06T 7/55* (2017.01)
*G06T 7/11* (2017.01)

(52) U.S. Cl.
CPC ............... *H04N 5/278* (2013.01); *H04N 5/44* (2013.01); *G06T 2207/20112* (2013.01)

(56) References Cited

U.S. PATENT DOCUMENTS

| | | | |
|---|---|---|---|
| 2009/0028394 A1* | 1/2009 | Hosoi | H04N 5/23212 382/118 |
| 2009/0278949 A1* | 11/2009 | McMahan | G06F 17/30247 348/222.1 |
| 2009/0322926 A1 | 12/2009 | Ikeda et al. | |
| 2010/0058182 A1* | 3/2010 | Jung | G06F 3/04817 715/702 |
| 2011/0058052 A1* | 3/2011 | Bolton | H04M 1/7253 348/211.99 |
| 2011/0304750 A1* | 12/2011 | Lee | H04N 5/23293 348/240.99 |
| 2011/0309232 A1* | 12/2011 | Lyu | H04N 5/35581 250/208.1 |
| 2012/0050587 A1 | 3/2012 | Yamamoto | |
| 2013/0088614 A1* | 4/2013 | Lee | G06T 5/002 348/223.1 |
| 2014/0184870 A1* | 7/2014 | Shiohara | H04N 5/23212 348/333.11 |
| 2014/0267869 A1 | 9/2014 | Sawa | |
| 2015/0077581 A1 | 3/2015 | Baltz et al. | |
| 2016/0261807 A1* | 9/2016 | Seshadrinathan | H04N 5/2258 |
| 2018/0013955 A1* | 1/2018 | Kim | H04N 5/23241 |

FOREIGN PATENT DOCUMENTS

| | | |
|---|---|---|
| EP | 3073733 A1 | 9/2016 |
| WO | WO 2015/081563 A1 | 6/2015 |

* cited by examiner (a)  (b)

FIG. 26
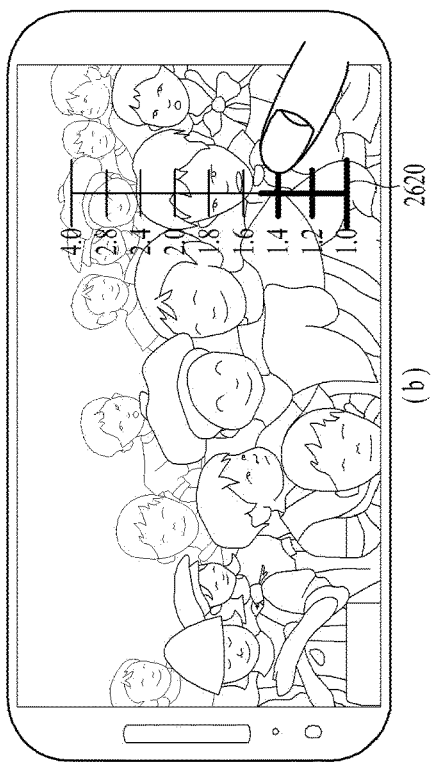
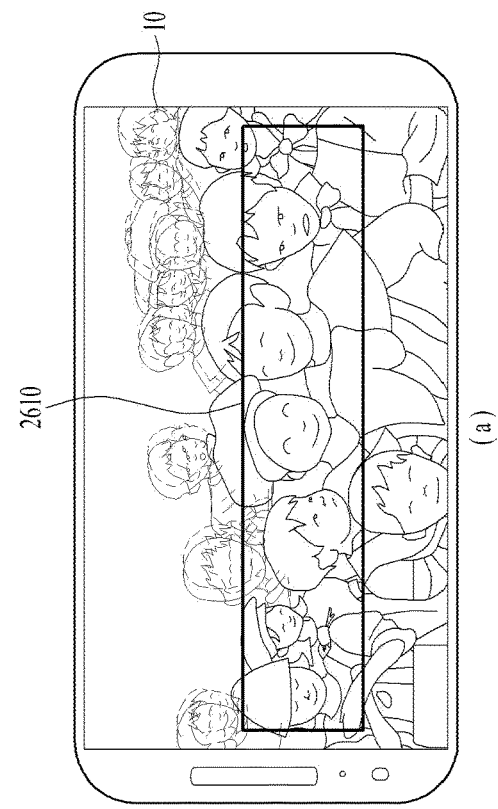

MOBILE TERMINAL AND CONTROLLING METHOD THEREOF

CROSS REFERENCE TO THE RELATED APPLICATIONS

Pursuant to 35 U.S.C. § 119(a), this application claims the benefit of earlier filing date and right of priority to Korean Application No. 10-2016-0052377, filed on Apr. 28, 2016, the contents of which are hereby incorporated by reference herein in their entirety.

BACKGROUND OF THE INVENTION

Field of the Invention

The present invention relates to a mobile terminal, and more particularly, to a mobile terminal and controlling method thereof. Although the present invention is suitable for a wide scope of applications, it is particularly suitable for providing various user interfaces related to a camera by adjusting aperture values of a plurality of cameras provided to the mobile terminal.

Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. Further, the mobile terminals can be further classified into handheld terminals and vehicle mounted terminals. There are ongoing efforts to support and increase the functionality of mobile terminals. Such efforts include software and hardware improvements, as well as changes and improvements in the structural components which form the mobile terminal.

Since image segmentation using a single image sensed by a single camera of the related art is unable to obtain information on depth, it causes a problem that segmentation performance is degraded. Moreover, in case of image segmentation using a plurality of images sensed by a plurality of cameras, since an object included in an image differs in solution per distance, it causes a problem that performance is degraded.

Generally, when a dynamic object is included in a view angle area, if an image is captured by increasing an exposure time, a static object may be captured unclearly due to destabilization. Moreover, when HDR (high dynamic range) is performed based on an image sensed by a single camera, if an object in a view angle area or the camera moves, differences are generated from a plurality of images.

SUMMARY OF THE INVENTION

Accordingly, embodiments of the present invention are directed to a mobile terminal and controlling method thereof that substantially obviate one or more problems due to limitations and disadvantages of the related art.

One object of the present invention is to provide a mobile terminal and controlling method thereof, by which user's depth adjustment for a captured or preview image is facilitated.

Another object of the present invention is to provide a mobile terminal and controlling method thereof, by which HDR is performed based on images sensed through a plurality of cameras.

Further object of the present invention is to provide a mobile terminal and controlling method thereof, by which a dynamic object and a static object are clearly output based on images captured through a plurality of cameras.

Another further object of the present invention is to provide a mobile terminal and controlling method thereof, by which a user can selectively capture a plurality of preview images sensed through a plurality of cameras.

Technical tasks obtainable from the present invention are non-limited by the above-mentioned technical tasks. Further, other unmentioned technical tasks can be clearly understood from the following description by those having ordinary skill in the technical field to which the present invention pertains.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a mobile terminal according to one embodiment of the present invention may include a display unit, a sensing unit, and a controller configured to output a first image to the display unit, wherein the first image includes a focusing region and an out-focusing region, wherein depth of the first image corresponds to a first depth, wherein if the first image corresponds to a captured image, the controller is further configured to control a second image to be output in response to a first input signal, and wherein in the second image, depth of the out-focusing region is changed into a second depth.

In another aspect of the present invention, as embodied and broadly described herein, a method of controlling a mobile terminal according to another embodiment of the present invention may include the steps of outputting a first image to a display unit, the first image including a focusing region and an out-focusing region, depth of the first image corresponding to a first depth and if the first image corresponds to a captured image, outputting a second image in response to a first input signal, wherein in the second image, depth of the out-focusing region is changed into a second depth.

It is to be understood that both the foregoing general description and the following detailed description of the preferred embodiments of the present invention are exemplary and explanatory and are intended to provide further explanation of the invention as claimed.

BRIEF DESCRIPTION OF THE DRAWINGS

The present invention will become more fully understood from the detailed description given herein below and the accompanying drawings, which are given by illustration only, and thus are not limitative of the present invention, and wherein:

FIG. 26 is a diagram illustrating one example of setting an aperture value in case of capturing image through a front camera in a mobile terminal according to one embodiment of the present invention;

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another. When an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
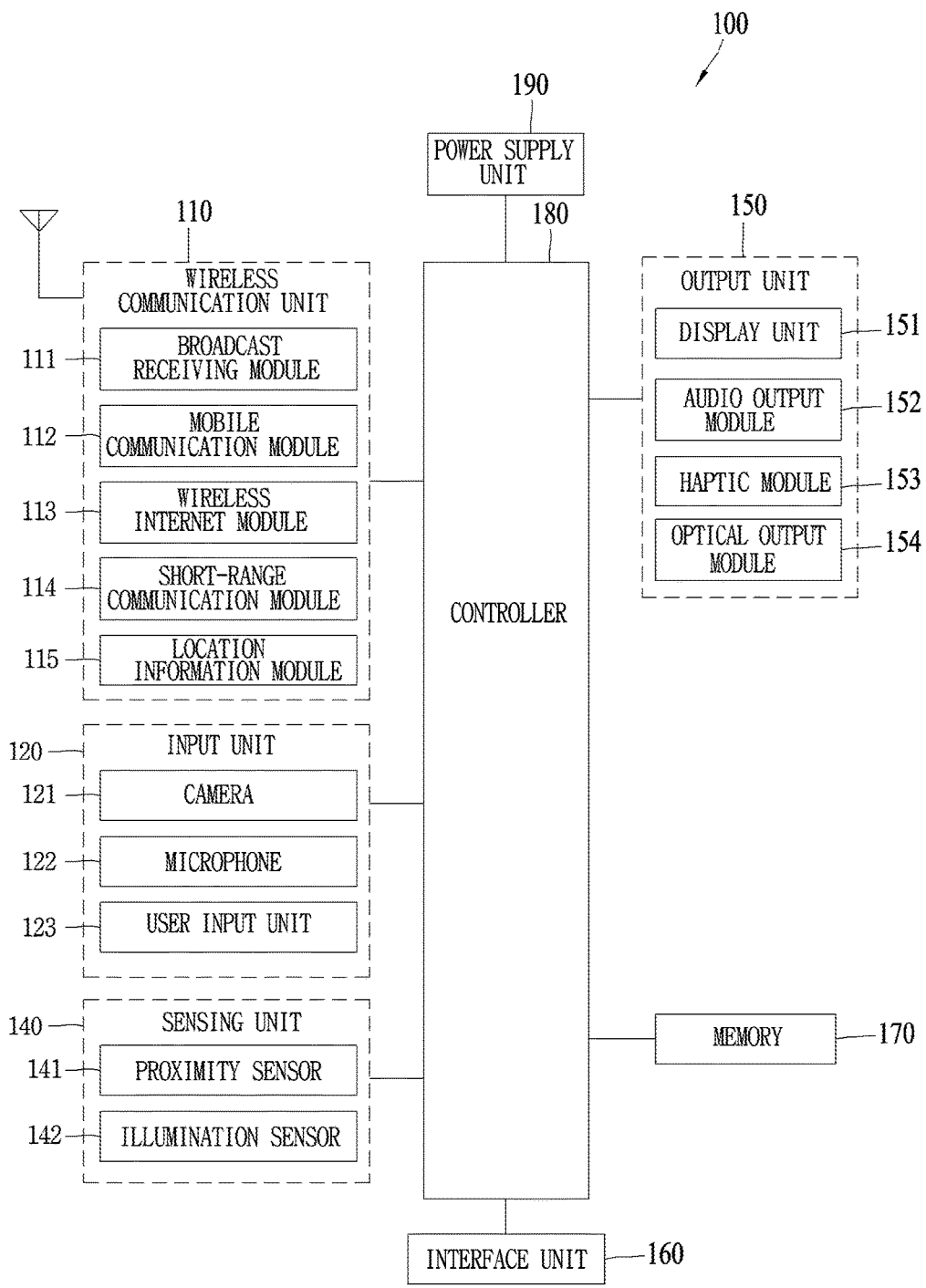
FIG. 1A is a block diagram of a mobile terminal according to an embodiment of the present disclosure.
Figure 1B:
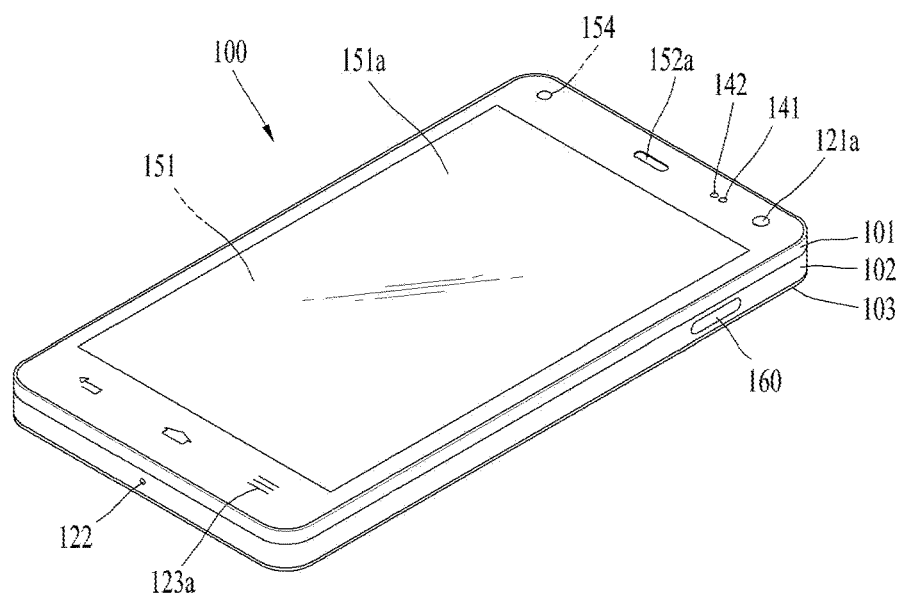
FIGS. 1B and 1C are conceptual views of one example of the mobile terminal, viewed from different directions.
Figure 1C:
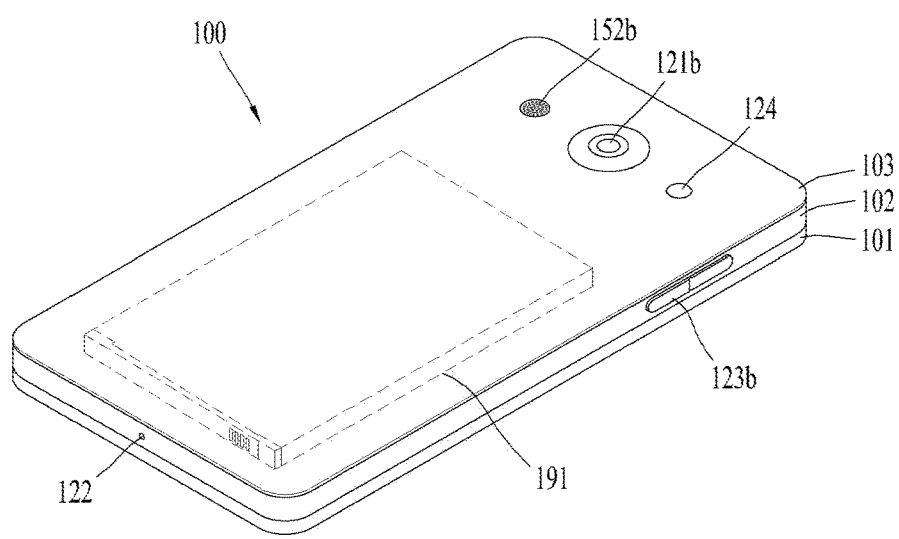

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions. The mobile terminal 100 is shown having components such as a wireless communication unit 110, an input unit 120, a sensing unit 140, an output unit 150, an interface unit 160, a memory 170, a controller 180, and a power supply unit 190. Implementing all of the illustrated components is not a requirement, and that greater or fewer components may alternatively be implemented. Referring now to FIG. 1A, the mobile terminal 100 is shown having wireless communication unit 110 configured with several commonly implemented components.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115. The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 processes signals, data, and information input or output through the components mentioned in the foregoing description or runs an application program saved in the memory 170, thereby providing or processing an information or function appropriate for a user.

The controller 180 can provide or process information or functions appropriate for a user by processing signals, data, information and the like, which are input or output by the various components depicted in FIG. 1A, or activating application programs stored in the memory 170. As one example, the controller 180 controls some or all of the components illustrated in FIG. 1A according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least one portion of the respective components can cooperatively operate to implement operations, controls or controlling methods of a mobile terminal according to various embodiments of the present invention mentioned in the following description. The operations, controls or controlling methods of the mobile terminal can be implemented on the mobile terminal by executing at least one application program saved in the memory 170.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this instance, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages. The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others. As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180, the controller 180, and combinations thereof.

In some embodiments, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented so the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 can typically control the general operations of the mobile terminal 100. For example, the controller 180 can set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance. Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151*a* of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like. As an alternative to the example in which the plurality of cases form an inner space for accommodating components, the mobile terminal 100 may be configured such that one case forms the inner space. In this example, a mobile terminal 100 having a uni-body is formed so synthetic resin or metal extends from a side surface to a rear surface.

If desired, the mobile terminal 100 may include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may be equipped with the display unit 151, the first audio output unit 152a, the second audio output unit 152b, the proximity sensor 141, the illumination sensor 142, the optical output unit 154, the first camera 121a, the second camera 121b, the first manipulating unit 123a, the second manipulating unit 123b, the microphone 122, the interface unit 160, and the like.

FIGS. 1B and 1C depict certain components as arranged on the mobile terminal. However, alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a. The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this instance, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof. Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123. The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject. As shown in FIG. 1C, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

A communication system which is operable with the variously described mobile terminals will now be described in more detail. Such a communication system may be configured to utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, Long Term Evolution (LTE), LTE-A (Long Term Evolution-Advanced)), Global System for Mobile Communications (GSM), and the like.

By way of a non-limiting example only, further description will relate to a CDMA communication system, but such teachings apply equally to other system types including a CDMA wireless communication system as well as OFDM (Orthogonal Frequency Division Multiplexing) wireless communication system.

A CDMA wireless communication system generally includes one or more mobile terminals (MT or User Equipment, UE) 100, one or more base stations (BSs, NodeB, or evolved NodeB), one or more base station controllers (BSCs), and a mobile switching center (MSC). The MSC is configured to interface with a conventional Public Switched Telephone Network (PSTN) and the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 of FIG. 1A is typically configured inside the mobile terminal 100 to receive broadcast signals transmitted by the BT.

Global Positioning System (GPS) satellites for locating the position of the mobile terminal 100, for example, may cooperate with the CDMA wireless communication system. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites may alternatively or additionally be configured to provide satellite DMB transmissions.

The location information module 115 is generally configured to detect, calculate, or otherwise identify a position of the mobile terminal. As an example, the location information module 115 may include a Global Position System (GPS) module, a Wi-Fi module, or both. If desired, the location information module 115 may alternatively or additionally function with any of the other modules of the wireless communication unit 110 to obtain data related to the position of the mobile terminal.

A typical GPS module 115 can measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites. Furthermore, the GPS module can acquire speed information in real time to calculate a current position. Sometimes, accuracy of a measured position may be compromised when the mobile terminal is located in a blind spot of satellite signals, such as being located in an indoor space. In order to minimize the effect of such blind spots, an alternative or supplemental location technique, such as Wi-Fi Positioning System (WPS), may be utilized.

The Wi-Fi positioning system (WPS) refers to a location determination technology based on a wireless local area network (WLAN) using Wi-Fi as a technology for tracking the location of the mobile terminal 100. This technology typically includes the use of a Wi-Fi module in the mobile terminal 100 and a wireless access point for communicating with the Wi-Fi module. The Wi-Fi positioning system may include a Wi-Fi location determination server, a mobile terminal, a wireless access point (AP) connected to the mobile terminal, and a database stored with wireless AP information.

The mobile terminal connected to the wireless AP may transmit a location information request message to the Wi-Fi location determination server. The Wi-Fi location determination server extracts the information of the wireless AP connected to the mobile terminal 100, based on the location information request message (or signal) of the mobile terminal 100. The information of the wireless AP may be transmitted to the Wi-Fi location determination server through the mobile terminal 100, or may be transmitted to the Wi-Fi location determination server from the wireless AP.

The information of the wireless AP extracted based on the location information request message of the mobile terminal 100 may include one or more of media access control (MAC) address, service set identification (SSID), received signal strength indicator (RSSI), reference signal received Power (RSRP), reference signal received quality (RSRQ), channel information, privacy, network type, signal strength, noise strength, and the like.

The Wi-Fi location determination server may receive the information of the wireless AP connected to the mobile terminal 100 as described above, and may extract wireless AP information corresponding to the wireless AP connected to the mobile terminal from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like. In order to remove wireless APs provided using a mobile AP or an illegal MAC address during a location determining process, the Wi-Fi location determination server may extract only a predetermined number of wireless AP information in order of high RSSI.

Then, the Wi-Fi location determination server may extract (analyze) location information of the mobile terminal 100 using at least one wireless AP information extracted from the database. A method for extracting (analyzing) location information of the mobile terminal 100 may include a Cell-ID method, a fingerprint method, a trigonometry method, a landmark method, and the like.

The Cell-ID method is used to determine a position of a wireless AP having the largest signal strength, among peripheral wireless AP information collected by a mobile terminal, as a position of the mobile terminal. The Cell-ID method is an implementation that is minimally complex, does not require additional costs, and location information can be rapidly acquired. However, in the Cell-ID method, the precision of positioning may fall below a desired threshold when the installation density of wireless APs is low.

The fingerprint method is used to collect signal strength information by selecting a reference position from a service area, and to track a position of a mobile terminal using the signal strength information transmitted from the mobile terminal based on the collected information. In order to use the fingerprint method, it is common for the characteristics of radio signals to be pre-stored in the form of a database.

The trigonometry method is used to calculate a position of a mobile terminal based on a distance between coordinates of at least three wireless APs and the mobile terminal. In order to measure the distance between the mobile terminal and the wireless APs, signal strength may be converted into distance information, Time of Arrival (ToA), Time Difference of Arrival (TDoA), Angle of Arrival (AoA), or the like may be taken for transmitted wireless signals.

The landmark method is used to measure a position of a mobile terminal using a known landmark transmitter. In addition to these position location methods, various algorithms may be used to extract (analyze) location information of a mobile terminal. Such extracted location information may be transmitted to the mobile terminal 100 through the Wi-Fi location determination server, thereby acquiring location information of the mobile terminal 100.

The mobile terminal 100 can acquire location information by being connected to at least one wireless AP. The number of wireless APs required to acquire location information of the mobile terminal 100 may be variously changed according to a wireless communication environment within which the mobile terminal 100 is positioned.

As previously described with regard to FIG. 1A, the mobile terminal may be configured to include short-range communication techniques such as Bluetooth™, Radio Frequency Identification (RFID), Infrared Data Association (IrDA), Ultra-Wideband (UWB), ZigBee, Near Field Communication (NFC), Wireless USB (Wireless Universal Serial Bus), and the like.

A typical NFC module provided at the mobile terminal supports short-range wireless communication, which is a non-contactable type of communication between mobile terminals and generally occurs within about 10 cm. The NFC module may operate in one of a card mode, a reader mode, or a P2P mode. The mobile terminal 100 may further include a security module for storing card information, in order to operate the NFC module in a card mode. The security module may be a physical medium such as Universal Integrated Circuit Card (UICC) (e.g., a Subscriber Identification Module (SIM) or Universal SIM (USIM)), a secure micro SD and a sticker, or a logical medium (e.g., embedded Secure Element (SE)) embedded in the mobile terminal. Single Wire Protocol (SWP)-based data exchange may be performed between the NFC module and the security module.

When the NFC module operates in a card mode, the mobile terminal may transmit card information on a general IC card to the outside. More specifically, if a mobile terminal having card information on a payment card (e. g, a credit card or a bus card) approaches a card reader, a short-range mobile payment may be executed. As another example, if a mobile terminal which stores card information on an entrance card approaches an entrance card reader, an entrance approval procedure may start. A card such as a credit card, a traffic card, or an entrance card may be included in the security module in the form of applet, and the security module may store card information on the card mounted therein. Card information for a payment card may include any of a card number, a remaining amount and usage history, and the like. Card information of an entrance card may include any of a user's name, a user's number (e.g., undergraduate number or staff number), an entrance history, and the like.

When the NFC module operates in a reader mode, the mobile terminal can read data from an external tag. The data received from the external tag by the mobile terminal may be coded into the NFC Data Exchange Format defined by the NFC Forum. The NFC Forum generally defines four record types. More specifically, the NFC Forum defines four Record Type Definitions (RTDs) such as smart poster, text, Uniform Resource Identifier (URI), and general control. If the data received from the external tag is a smart poster type, the controller may execute a browser (e.g., Internet browser). If the data received from the external tag is a text type, the controller may execute a text viewer. If the data received from the external tag is a URI type, the controller may execute a browser or originate a call. If the data received from the external tag is a general control type, the controller may execute a proper operation according to control content.

In some cases in which the NFC module operates in a P2P (Peer-to-Peer) mode, the mobile terminal can execute P2P communication with another mobile terminal. In this instance, Logical Link Control Protocol (LLCP) may be applied to the P2P communication. For P2P communication, connection may be generated between the mobile terminal and another mobile terminal. This connection may be categorized as a connectionless mode which ends after one packet is switched, and a connection-oriented mode in which packets are switched consecutively. For a typical P2P communication, data such as an electronic type name card, address information, a digital photo and a URL, a setup parameter for Bluetooth connection, Wi-Fi connection, etc. may be switched. The P2P mode can be effectively utilized in switching data of a small capacity, because an available distance for NFC communication is relatively short.

Figure 2:
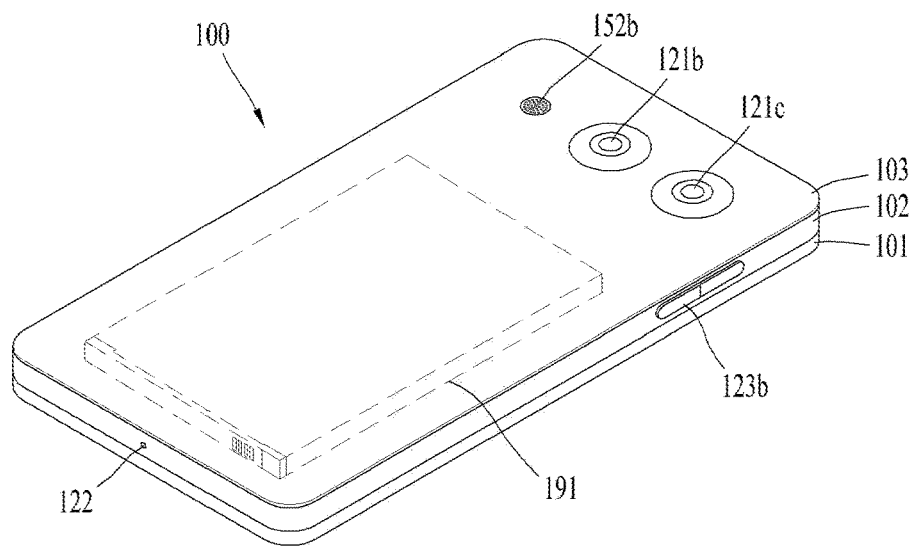
FIG. 2 is a conceptual view of a deformable mobile terminal according to an alternative embodiment of the present disclosure.

FIG. 2 is a rear view diagram illustrating another example of a mobile terminal according to one embodiment of the present invention. According to one embodiment of the present invention, the mobile terminal may include a second camera 121b and a third camera 121c. When the second camera 121b includes a normal camera having a normal photographing angle, assume that the third camera 121c includes a wide angle camera having a photographing angle wider than that of the second camera 121b.

The wide angle camera may mean a camera equipped with wide-angle lens of which focal distance is considerably smaller than that of the normal camera. Since the wide angle camera has the wide photographing angle despite having a relatively small focal distance, it can bring an effect of capturing image in farther distance. Hence, the wide angle camera can be utilized popularly.

Referring to FIG. 2, the second camera 121b and the third camera 121c can be disposed adjacently on one side of the mobile terminal 100. Although FIG. 2 shows one example that the cameras are disposed on a rear side of the mobile terminal, both a normal camera and a wide angle camera can be disposed adjacently on a front side of the mobile terminal 100. Alternatively, both of the normal camera and the wide angle camera may be disposed adjacently on each of the front and rear sides of the mobile terminal 100.

Images received through the normal camera and the wide angle camera disposed adjacently may overlap with each other in part or one image may overlap with the other image by being entirely included in the other image. According to one embodiment of the present invention, a case that a normal image received through a normal camera is included in a wide angle image received through a wide angle camera is taken as one example for the following description, by which the present invention is non-limited. For example, the present invention is applicable to a case that the normal and the wide angle image overlap with each other in part.

Thus, according to one embodiment of the present invention, when a normal camera and a wide angle camera are disposed adjacently, the respective cameras are effectively used.

In FIGS. 3 to 30, for a preview image sensed or captured through at least one camera provided to a mobile terminal, a user interface configured to change and output a portion of the image is provided in response to user's input.

According to an embodiment of the present invention, the meaning of depth may be similar to that of an aperture value.

For instance, if an aperture value of a camera is low, an image of low depth may be sensed. Hence, in the description of the present invention, assume that depth and aperture value are terms that can be substituted with each other. Meanwhile, an image of low depth may indicate when a focused region of a camera in an image is narrow. Hence, an image of low depth may be taken by being blurred except a focused region. Moreover, an image of high depth may indicate when a focused region of a camera in the image is wide. Hence, an image of high depth can be taken by being clear overall.

Meanwhile, when focal distances of a plurality of cameras provided to a mobile terminal are different from each other (e.g., a wide angle camera and a narrow angle camera among a plurality of cameras differ from each other in focal distance), when images are taken by setting the cameras at the same aperture value, the present invention assumes that the images have the same depth.

Figure 3:
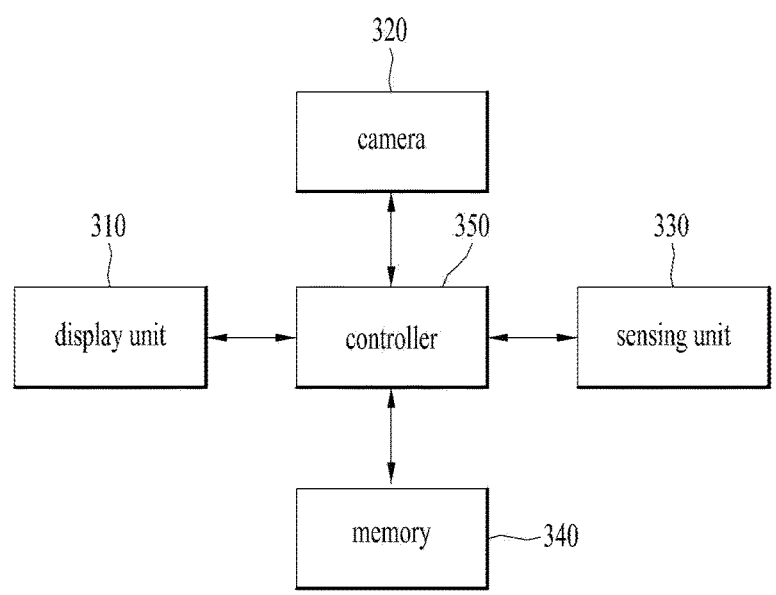
FIG. 3 is a block diagram of a mobile terminal according to one embodiment of the present invention.

Next, FIG. 3 is a block diagram of a mobile terminal according to one embodiment of the present invention. According to one embodiment of the present invention, a mobile terminal may include a display unit 310, a camera 320, a sensing unit 330, a memory 340 and a controller 350.

The display unit 310 can display visual information. In this instance, the visual information may include content, application, image, video, icon, user interface and the like. Further, the display unit 310 can output visual information based on a control command of the controller 340. According to an embodiment of the present invention, the display unit 310 may be embodied into the display 151 shown in FIG. 1A. According to one embodiment of the present invention, the display unit 310 can output a executing screen of a camera application and a executing screen of a gallery application.

The camera 320 can sense an object or subject within a view angle area. According to an embodiment of the present invention, the camera 320 may be embodied into the camera 121 shown in FIG. 1A. According to one embodiment of the present invention, as mentioned in the foregoing description with reference to FIG. 2, a plurality of cameras can be provided to a rear side of the mobile terminal. For instance, one of the cameras may correspond to a normal camera having a normal view angle, while another may correspond to a wide angle camera having a wide view angle. According to an embodiment of the present invention, the camera 320 can sense an object or subject in a view angle area using at least one of the normal camera and the wide angle camera.

The sensing unit 330 senses user's various inputs to the mobile terminal and environment of the mobile terminal and can then deliver a sensing result to enable the controller 340 to perform a corresponding operation. According to an embodiment of the present invention, the sensing unit 340 may be embodied into the sensing unit 140 or the input unit 120 shown in FIG. 1A. According to one embodiment of the present invention, the sensing unit 330 may be embodied into a touchscreen together with the display unit 310. According to one embodiment of the present invention, the sensing unit 330 can sense various touch inputs from a user.

The memory 340 can store data related to operations performed in the mobile terminal. For instance, the memory 340 may include a storage medium outside the mobile terminal as well as a storage medium provided to the mobile terminal. According to an embodiment of the present invention, the memory 340 can be embodied into the memory 170 shown in FIG. 1A. According to one embodiment of the present invention, the memory 340 can store an image captured by the camera of the mobile terminal.

The controller 350 processes data, controls the respective units of the mobile terminal, and can also control data transmissions/receptions between the units. According to an embodiment of the present invention, the controller 350 can be embodied into the controller 180 shown in FIG. 1A. According to one embodiment of the present invention, based on an input signal, the controller 350 can change depth of at least one partial region of a sensed image.

According to one embodiment of the present invention, operations performed by the mobile terminal can be controlled by the controller 345. Yet, for clarity of the following description, such operations shall be described as performed by the mobile terminal in general. Through the embodiments shown in FIGS. 4 to 30, a method of creating a sensed image and a depth-changed image of a captured image and performing HDR through a plurality of cameras shall be described in detail as follows.

Depth Adjustment of Preview Image

Image segmentation processes an image by partitioning the image into a plurality of regions and can be used to facilitate recognition and use of the image. Since the conventional image segmentation using a single image sensed by a single camera is unable to obtain information on depth, it causes a problem that segmentation performance is reduced. Moreover, in case of image segmentation using a plurality of images sensed by a plurality of cameras, since resolution of an object included in an image varies in accordance with distance, it causes a problem that performance is reduced.

In order to solve the above problems, the present invention proposes a method of performing image segmentation and synthesis using a plurality of images sensed by a single camera. With reference to FIGS. 4 to 7, while a camera application is executing, a method of adjusting an aperture value or depth of a preview image is described as follows. According to the embodiments shown in FIGS. 4 to 7, assume that a mobile terminal uses one of a plurality of cameras provided to a rear side of the mobile terminal.

Figure 4:
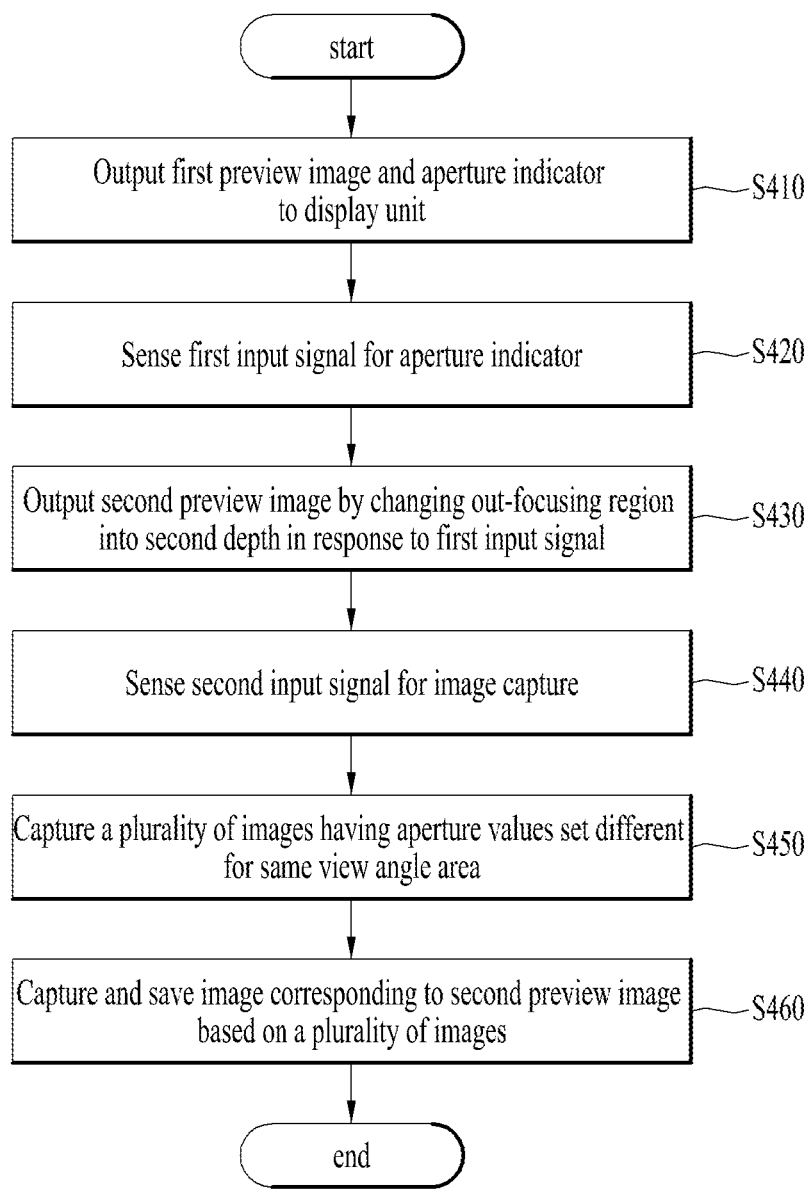
FIG. 4 is a flowchart illustrating a method of adjusting depth of a preview image in a mobile terminal according to one embodiment of the present invention.

FIG. 4 is a flowchart illustrating a method of adjusting depth of a preview image in a mobile terminal according to one embodiment of the present invention. When a camera application is launched, a mobile terminal can control a first preview image and an aperture indicator to be output to a display unit (S410). In this instance, the first preview image may include a focusing region and an out-focusing region. For instance, the focusing region can be automatically created according to a result from sensing an object from a camera. With respect to this, details shall be described with reference to FIG. 5 later.

The mobile terminal can sense a first input signal applied to the aperture indicator (S420). In particular, the mobile terminal can sense the first input signal of selecting an aperture value output to an aperture control bar included in the aperture indicator. In response to the first input signal, the mobile terminal can output a second preview image in which depth of the out-focusing region is changed (S430). In particular, the mobile terminal can output the second preview image in which depth of a sensed region of the first input signal in the out-focusing region is changed.

Subsequently, the mobile terminal can sense a second input signal for an image capture (S440). In this instance, the second input signal may include an input to a soft key or a hardware key included in the mobile terminal. In response to the second input signal, the mobile terminal can consecutively capture a plurality of images of which aperture values for the same view angle area are set different from each other (S450).

Subsequently, based on a plurality of the images, the mobile terminal can output a captured image corresponding to the second preview image (S460). In particular, based on a plurality of the captured images, the mobile terminal can create and output the second preview image. Further, the mobile terminal can save the output image.

With respect to this, embodiments are described with reference to FIGS. 5 to 7 as follows. In particular, FIG. 5 is a diagram illustrating one example of adjusting a depth of a preview image sensed by a camera in a mobile terminal according to one embodiment of the present invention.

Figure 5:
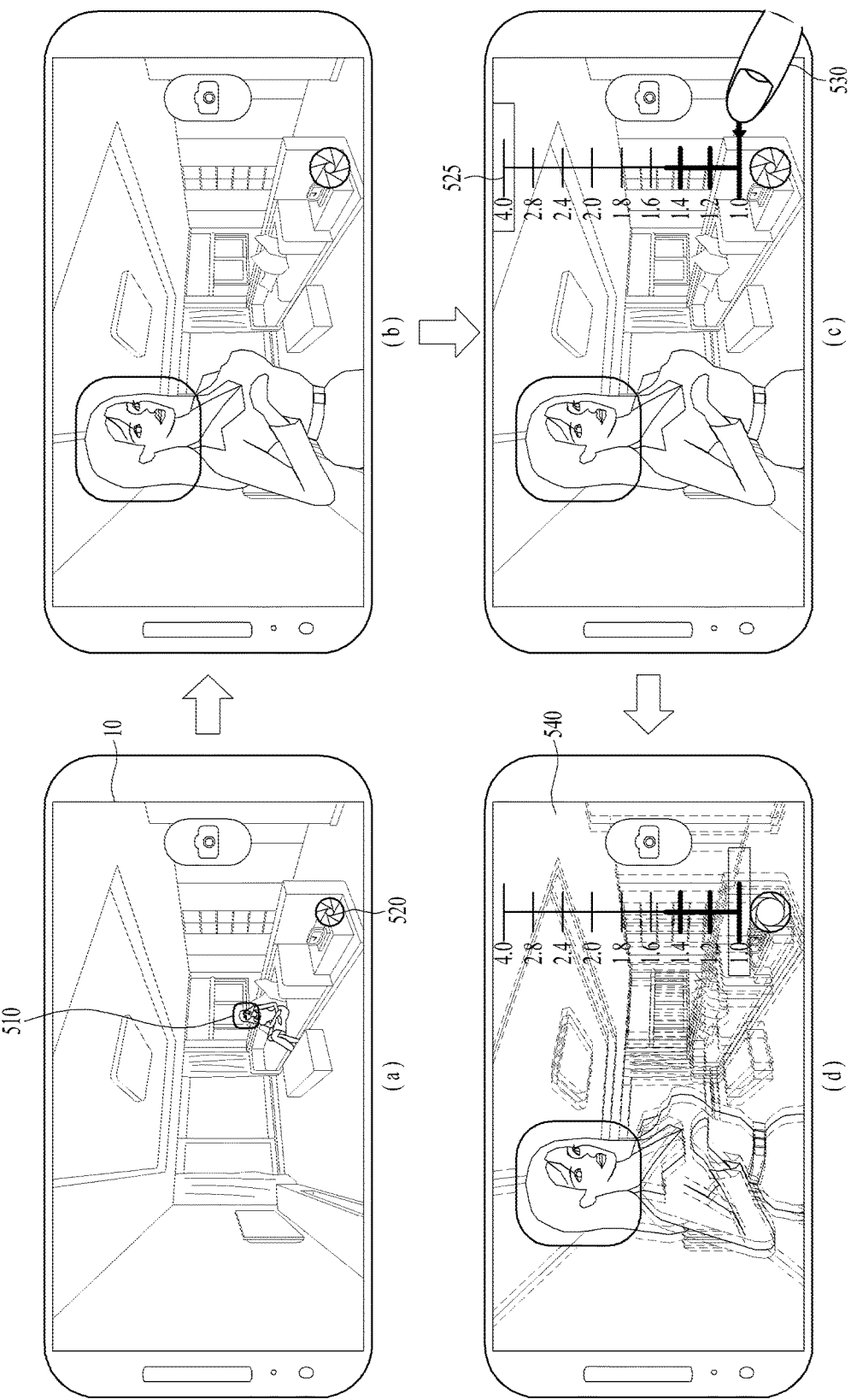
FIG. 5 is a diagram illustrating one example of adjusting depth of a preview image sensed by a camera in a mobile terminal according to one embodiment of the present invention.

Particularly, FIG. 5 shows a method of adjusting a depth of a region except a focusing region for a preview image output on a camera application. If a camera application is launched, a mobile terminal can control a first preview image 10, which is sensed from a view angle area of a camera, to be output to a display unit. In this instance, the first preview image 10 corresponds to an image sensed from a view angle area according to a preset aperture value. Further, as shown in FIG. 5 (a), the mobile terminal can automatically create and output a focusing region 510. For instance, based on analyzing at least one a distance between an object in the view angle area and a lens provided to the camera and an image of the object, the mobile terminal can automatically create the focusing region. Referring to FIG. 5 (a), the mobile terminal automatically creates a preview image focusing region 510 and can display the created region.

In addition, referring to FIG. 5 (a), the mobile terminal can automatically set the focusing region for a character among objects sensed within the view angle area. For instance, the mobile terminal can automatically set the focusing region for a character through face recognition. Further, focusing region setting methods can employ various methods as well as the above method.

The mobile terminal can output an aperture indicator 520 to the preview image 10. The aperture indicator 520 can indicate a current aperture value of a camera lens and a current depth of the preview image. For instance, the aperture indicator 520 shown in FIG. 5 (a) indicates a state of a high aperture value (i.e., high depth) when a caliber of an aperture is small.

The mobile terminal can sense a movement of the object at which the focusing region is set through the camera. Referring to FIG. 5 (b), the object may move closer to the mobile terminal. For instance, based on a difference in face size of the object, the mobile terminal can sense that a distance between the object and the mobile terminal decreases. Moreover, for instance, through phase detection, the mobile terminal can sense that the distance between the object and the mobile terminal decreases. Moreover, for instance, the mobile terminal applies a laser beam to the object, thereby sensing that the distance between the object and the mobile terminal decreases. Of course, the above-described method of measuring distance between the mobile terminal and the object can be used independently or by being combined.

Further, as shown in FIG. 5 (c), if the distance between the object and the mobile terminal corresponds to a preset distance range, the mobile terminal can control an aperture control bar 525 to be output to a location adjacent to the aperture indicator 520. The aperture control bar 525 can display both a real aperture value implementable by hardware and a digital aperture value implementable by software. For instance, in the aperture control bar 525 shown in FIG. 5 (c), aperture values up to 1.6 can be actually implemented by a camera lens. Aperture values below 1.6 can be implemented as blurred images through image processing by the mobile terminal.

While the aperture control bar 525 is output, the mobile terminal can sense an input signal 530 to a region having an aperture value of 1.0. In this instance, as shown in FIG. 5 (d), the mobile terminal can output a second preview image 540 based on the set aperture value. In addition, the second preview image 540 may correspond to an image out of focus according to an aperture value set by a user when the focusing region 510 is in focus. The mobile terminal can output the aperture indicator 520 in a wide caliber state. Through this, the user can easily recognize the aperture value of the second preview image 540.

Figure 6:
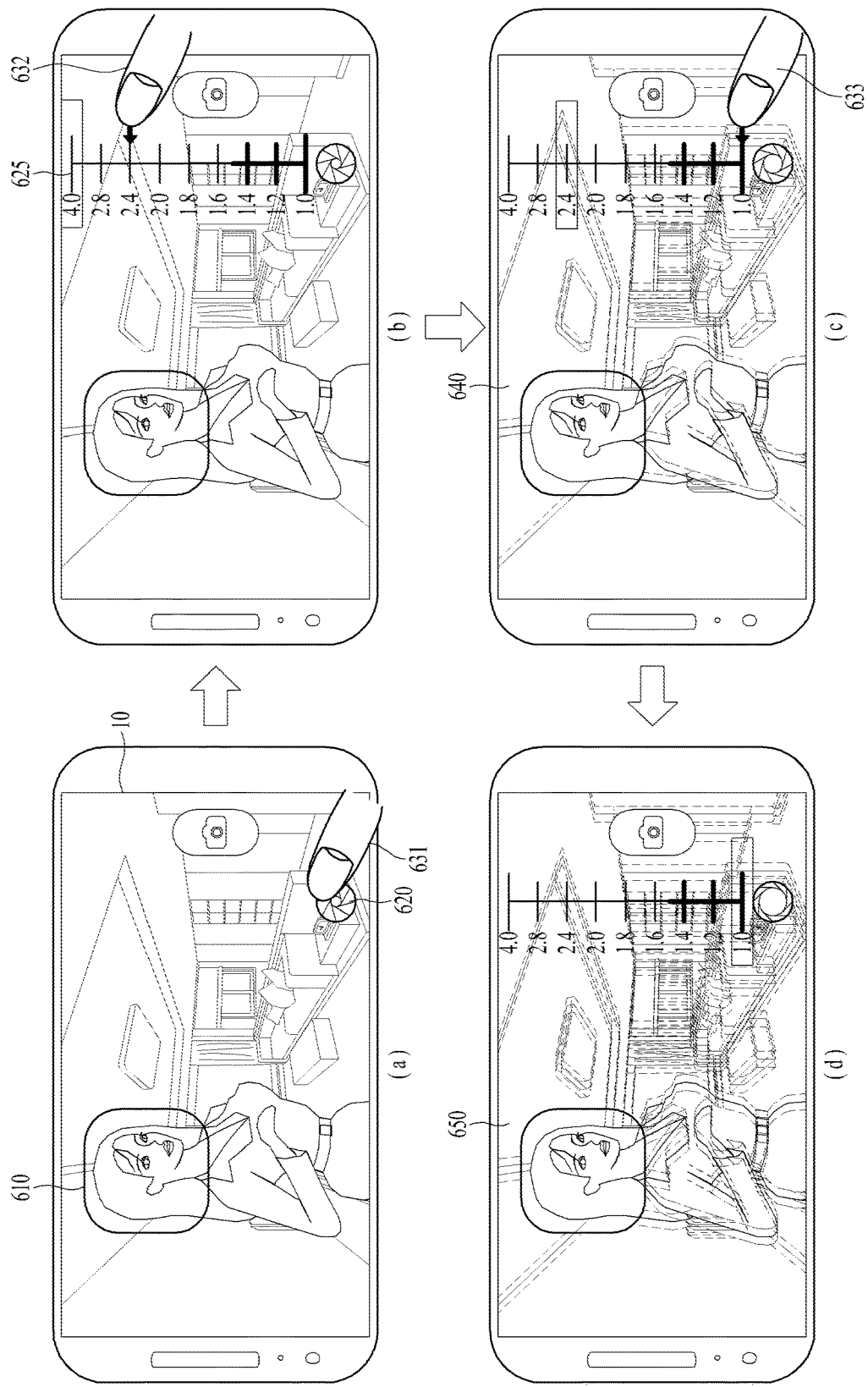
FIG. 6 is a diagram illustrating one example of adjusting depth of a preview image sensed by a camera in a mobile terminal according to one embodiment of the present invention.

Next, FIG. 6 is a diagram illustrating one example of adjusting depth of a preview image sensed by a camera in a mobile terminal according to one embodiment of the present invention. In the following description of the embodiment shown in FIG. 6, details redundant with those described with reference to FIG. 5 are omitted.

Referring to FIG. 6 (a), if a camera application is launched, a mobile terminal can output a first preview image 10 and an aperture indicator 620. In this instance, the first preview image 10 corresponds to an image sensed with a preset aperture value. The mobile terminal can display a focusing region 610 by setting a focusing region automatically. The mobile terminal can sense a first input signal 631 for the aperture indicator 620. For instance, the first input signal 631 may correspond to one of various touch inputs.

Referring to FIG. 6 (b), the mobile terminal can output an aperture control bar 625. Unlike FIG. 5, the embodiment shown in FIG. 6 shows a case that the aperture control bar is output in response to user's input signal. In this instance, the aperture control bar 625 is assumed as the same of the former aperture control bar shown in FIG. 5. The mobile terminal can sense a second input signal 632 for a region having an aperture value set to 2.4 in the aperture control bar 625. For instance, as shown in FIG. 6 (c), in response to the second input signal 632, the mobile terminal can output a second preview image 640 resulting from adjusting an aperture value of an image sensed from a view angle area of the camera into 2.4. Further, a caliber of the aperture indicator 620 can be output larger than that of the first preview image 10.

The mobile terminal can sense a third input signal 633 for a region having an aperture value set to 1.0 in the aperture control bar 625. In this instance, as shown in FIG. 6 (d), in response to the third input signal, the mobile terminal can output a third preview image 650 resulting from adjusting an image sensed from a view angle area of the camera according to an aperture value 1.6. In particular, the third preview image 650, of which aperture value is changed in response to the third input signal, may correspond to an image of which depth is shallower than that of the second preview image 640 having the aperture value changed in response to the second input signal. Further, the caliber of the aperture indicator 620 can be output to be larger than that of the aperture indicator 620 of the second preview image 640.

Yet, since the camera provided to the mobile terminal according to an embodiment of the present invention is unable to implement aperture values up to 1.0 by hardware, a fourth preview image may correspond to an image output by further blurring an image through software.

Figure 7:
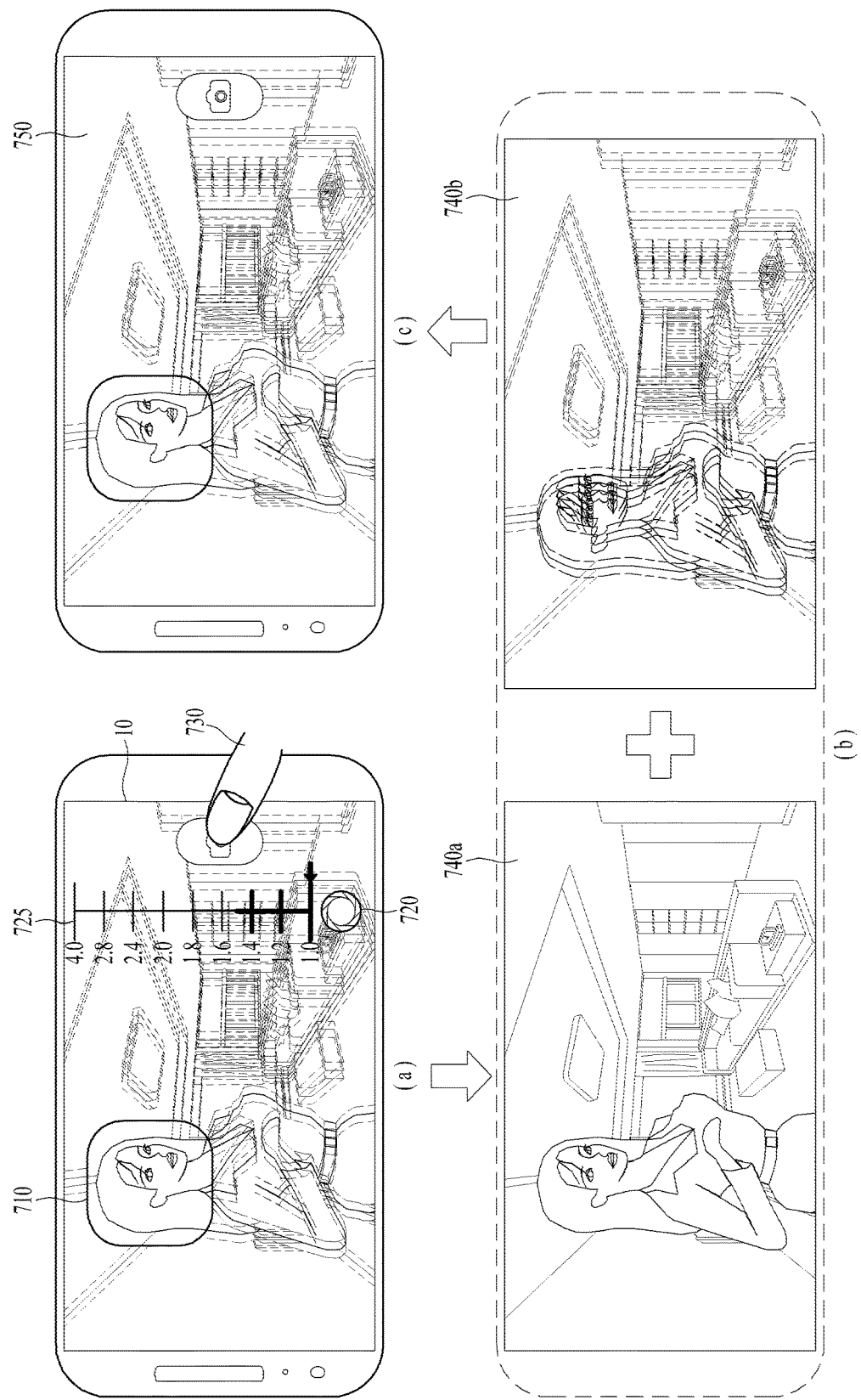
FIG. 7 is a diagram illustrating one example of capturing an image when an aperture value of a preview image sensed by a camera in a mobile terminal according to one embodiment of the present invention is set.

Next, FIG. 7 is a diagram illustrating one example of capturing an image when an aperture value of a preview image sensed by a camera in a mobile terminal according to one embodiment of the present invention is set. As an embodiment in continuation with the former embodiment shown in FIG. 6, while an aperture value is set to a value impossible to be implemented by hardware, when an image is captured, the embodiment shown in FIG. 7 shows a method of outputting the captured image.

Referring to FIG. 7 (a), a mobile terminal can output a preview image 10, of which aperture value is set to a minimum value, to a display unit. In this instance, as mentioned in the foregoing description with reference to FIG. 5 or FIG. 6, the preview image 10 may correspond to an image blurred by software instead of an image actually sensed through a camera. Moreover, the mobile terminal can output an aperture control bar 725 indicating a currently set aperture value as well as the preview image and an aperture indicator 720. In this instance, a face of a character included in the preview image may correspond to a state automatically set as a focusing region 710. Moreover, as mentioned in the foregoing description with reference to FIG. 6, a minimum aperture value of the preview image 10 corresponds to a digital aperture implemented by software and can provide a sense of actually photographing with a camera lens having a long focal distance by blurring an out-focusing region.

While the preview image 10 is output, the mobile terminal can sense an input signal 730 for image capture. In this instance, as shown in FIG. 7 (b), the mobile terminal can consecutively capture a plurality of images. For example, as shown in FIG. 7 (b), a first capture image 740a may correspond to an image captured with a maximum aperture value by a camera provided to the mobile terminal. For example, a second capture image 740b may correspond to an image captured with a minimum aperture value implementable by hardware of the camera provided to the mobile terminal.

In another instance, a first capture image may correspond to an image captured by being focused on a primary object such as a character in a view angle area. Further, a second capture image may correspond to an image captured by being focused on an object that is not the primary object in the view angle area. According to the present embodiment, 2 images are described as captured consecutively. Alternatively, the number of the captured images can be 3 or more by being non-limited by 2.

Referring to FIG. 7 (c), based on the first capture image 740a and the second capture image 740b, the mobile terminal can display an output image 750. Further, the mobile terminal extracts a focusing region and an out-focusing region based on a plurality of the captured images, creates the output image 750 by blurring the out-focusing region to correspond to a digital aperture value, and can then output the created output image 750 to the display unit. In this instance, the output image 750 may correspond to an image corresponding to the preview image 10.

According to the embodiments shown in FIGS. 4 to 7, a mobile terminal can provide an effect similar to an image captured by a camera (e.g., DSLR camera) having a large lens aperture through artificial blurring by a digital aperture value.

Depth Adjustment of Output Image

FIGS. 8 to 12 illustrate a method of adjusting an aperture value or depth of an output image when an image is captured through a camera application. In the embodiments shown in FIGS. 8 to 12, in order to provide a user interface capable of adjusting a depth of an output image, assume that a mobile terminal captures a plurality of images having aperture values set differently on image capturing. In this instance, an image output to the mobile terminal is assumed as corresponding to a representative one of a plurality of the images. When an input signal for depth adjustment for the representative image is sensed, the rest of the images are output for synthesis only and assumed as not output on a gallery application.

Figure 8:
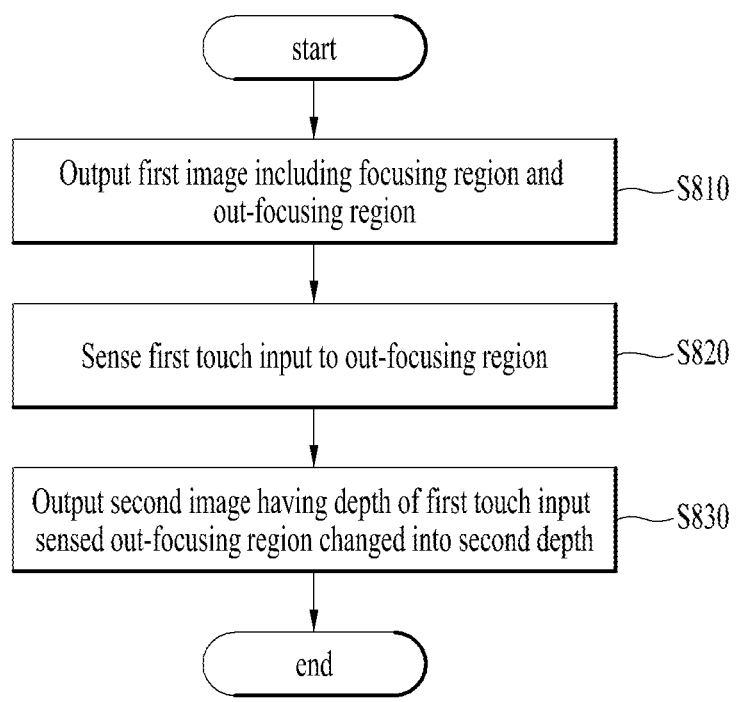
FIG. 8 is a flowchart illustrating a method of adjusting depth of an output image output in a mobile terminal according to one embodiment of the present invention.

In particular, FIG. 8 is a flowchart illustrating a method of adjusting depth of an output image output in a mobile terminal according to one embodiment of the present invention. As shown, a mobile terminal can output a first image including a focusing region and an out-focusing region to a display unit (S810). For instance, the focusing region is a region focused on capturing an image and may correspond to a clear part in the image. That is, the out-focusing region is a focusing region excluded region in the image and may correspond to a region having low depth or aperture value in the image. The mobile terminal can output an aperture icon together with the first image.

The mobile terminal can sense an input signal for the out-focusing region (S820). In this instance, the input signal may correspond to a signal for adjusting depth of the out-focusing region. For instance, the input signal may correspond to one of a drag touch input, a long & press touch input and the like. In this instance, the mobile terminal can control an image, in which depth of the input signal sensed region is changed, to be output (S830). In particular, the mobile terminal can output a second image synthesized by extracting an image corresponding to the changed depth of the input signal sensed region from a plurality of images associated with the first image. This shall be described again with reference to FIGS. 9 to 13.

Figure 9:
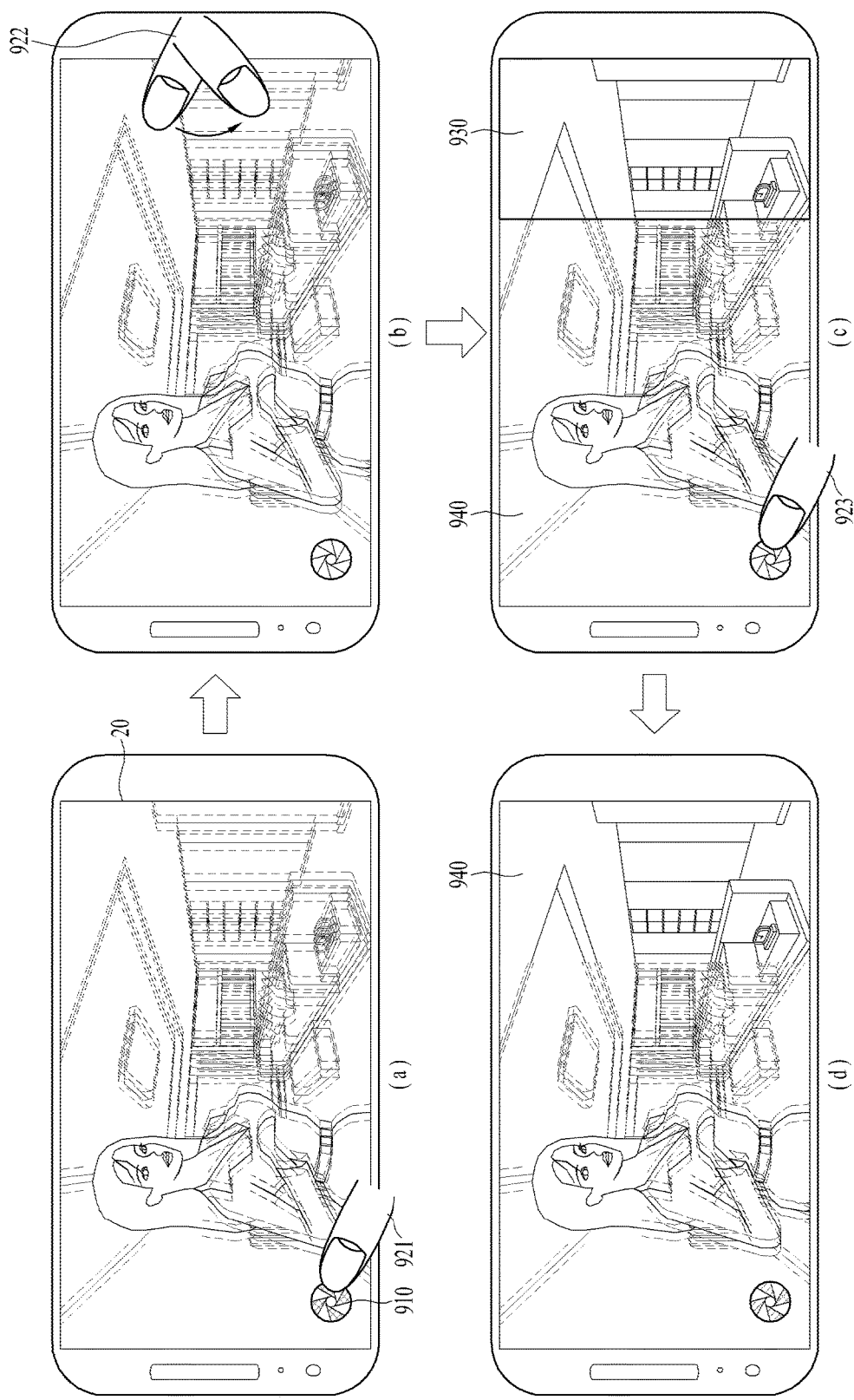
FIG. 9 is a diagram illustrating one example of adjusting depth of an output image output in a mobile terminal according to one embodiment of the present invention.

FIG. 9 is a diagram illustrating one example of adjusting depth of an output image output in a mobile terminal according to one embodiment of the present invention. Referring to FIG. 9 (a), while a gallery application is executing, a mobile terminal can output a first image 20 captured with a first aperture value. In this instance, the first image 20 may correspond to an image in which an out-focusing region except a focusing region is blurred. Further, the mobile terminal can output an aperture icon 910. In this instance, assume that the aperture icon 910 is output only when an image captured by being set at a digital aperture value on image capture, instead of being always output on outputting an image on the gallery application. For instance, a first depth of the first image 20 shown in FIG. 9 (a) may correspond to a minimum aperture value as a digital aperture value on photographing.

The mobile terminal can sense a first input signal 921 for the aperture icon 910. In this instance, the first input signal 921 is an input for activating the aperture icon 910 and corresponds to an input for adjusting depth of at least one portion of the first image 20. For instance, the first input signal 921 may correspond to one of a short touch, a long touch and the like.

If so, the mobile terminal can enter a depth control mode in response to the first input signal 921. If the depth control mode is entered, as shown in FIG. 9 (b), the mobile terminal can indicate that the depth control mode is entered by changing a graphic effect of the aperture icon 910.

In the depth control mode, the mobile terminal can sense a second input signal 922 for a first region 930 of a display unit. In this instance, the second input signal 922 may correspond to a drag touch input performed by rubbing the first region 930 of the first image 20. In response to the second input signal 922, the mobile terminal can control a second image 940, in which the depth of the first region 930 is changed into a second depth, to be output. The second depth may correspond to a value higher than the first depth.

In particular, a user can be provided with an intuitive user interface configured to enable a rubbed region of an image to become clear.

With respect to this, in response to the second input signal, the mobile terminal can determine the second depth. If the second depth is determined, the mobile terminal can search a plurality of images related to the first image for an image captured at the second depth or a depth similar to the second depth. The mobile terminal can segment or extract a part corresponding to the first region 930 from the image corresponding to the second depth. In addition, the mobile terminal can create a second image 940 by synthesizing the extracted region corresponding to the first region 930 with the first image 20. Regarding this, image segmentation and synthesis can include various methods known to those skilled in the art.

The mobile terminal can sense a third input signal for the aperture icon 910. In this instance, the third input signal 923 is a signal for ending the depth control mode and may correspond to the same input of the first input signal 921. In this instance, the mobile terminal can save the second image 940 to a memory. Instead of the first image 20, as shown in FIG. 9 (d), the mobile terminal can output the second image 940. For instance, the second image 940 may be saved to a location next to the first image 20 in the gallery application or saved as a separate group. Moreover, referring to FIG. 9 (d), if the depth control mode is ended, the graphic effect of the aperture icon 910 can be changed into the former effect before entering the depth control mode.

Figure 10:
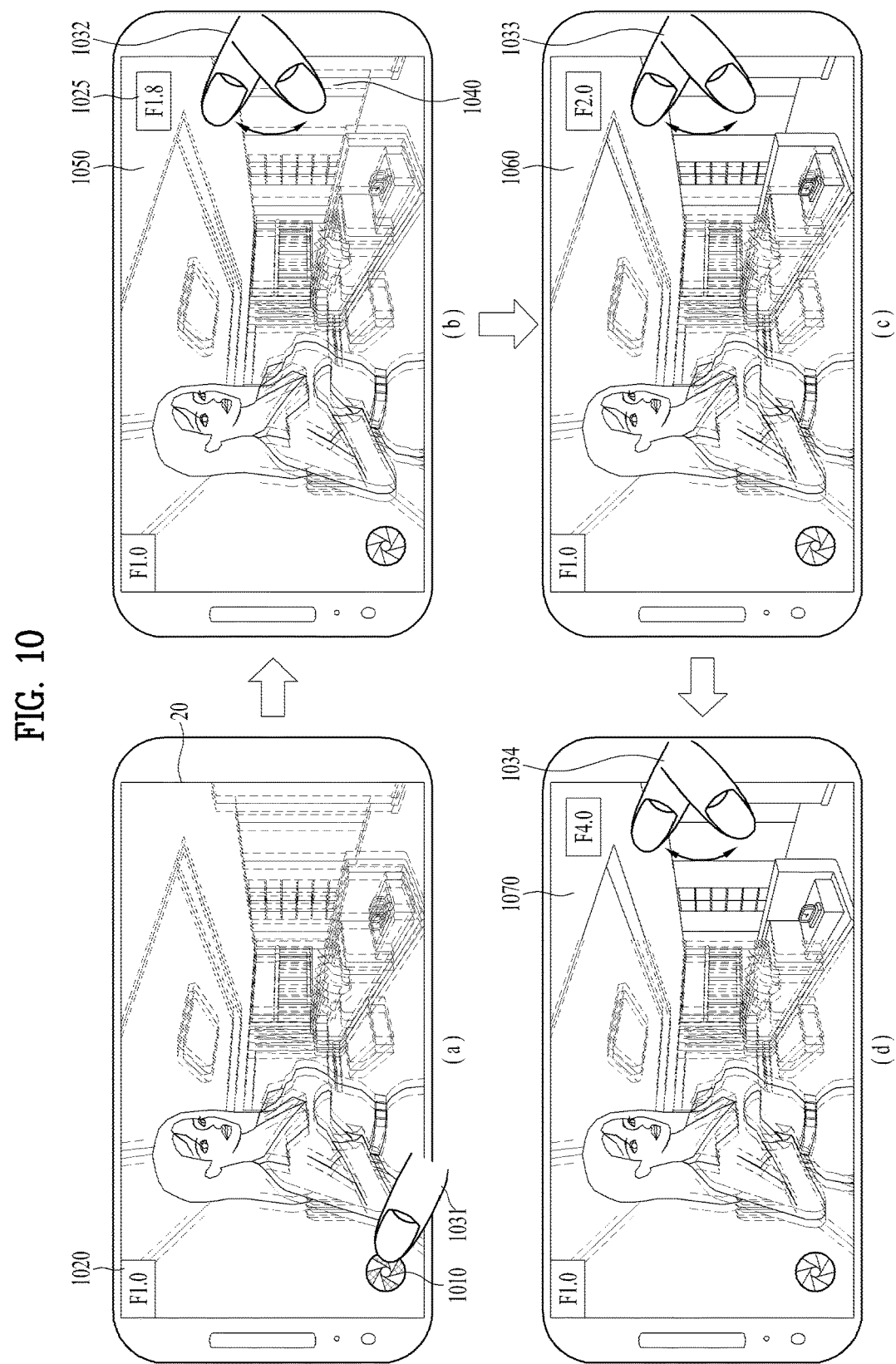
FIG. 10 is a diagram illustrating one example of adjusting depth of an output image output in a mobile terminal according to one embodiment of the present invention.

FIG. 10 is a diagram illustrating one example of adjusting depth of an output image output in a mobile terminal according to one embodiment of the present invention. Particularly, if input signals for an image are consecutively sensed plural times, FIG. 10 shows a case that a depth is changed stepwise in response to the input signal(s). Details redundant with the former description with reference to FIG. 9 are omitted from the following description.

Referring to FIG. 10 (a), while a gallery application is executing, a mobile terminal can output a first image 20 captured at first depth. Further, the mobile terminal can output an aperture icon 1010. Further, the mobile terminal can output a first indicator 1020 indicating an aperture value at a timing point of capturing the first image 20.

The mobile terminal can sense a first input signal 1031 for the aperture icon 1010. The first input signal 1031 is an input for activating the aperture icon 1010 and corresponds to an input for adjusting depth of at least one portion of the first image. In this instance, assume that the first input signal 1031 is the same as the first input signal shown in FIG. 9. In response to the first input signal 1031, the mobile terminal can enter a depth control mode.

In the depth control mode, the mobile terminal can sense a second input signal 1032 for a first region 1040 of a display unit. In this instance, the second input signal 1032 may correspond to a drag touch input performed by rubbing a selected region 1040 of the first image 20. In response to the second input signal 1032, the mobile terminal can control a second image 1050, in which the depth of the selected region 1040 is changed into a second depth, to be output. The second depth may correspond to a value higher than the first depth.

With respect to this, in response to the second input signal 1032, the mobile terminal can determine the second depth. If the second depth is determined, the mobile terminal can search a plurality of images related to the first image 20 for an image captured at the second depth or a depth similar to the second depth. The mobile terminal extracts a part corresponding to the selected region 1040 from the image corresponding to the second depth and can then create a second image 1050 by synthesizing the extracted part with the first image 20.

Referring to FIG. 10 (b), the mobile terminal can output a second indicator 1025 to a region adjacent to the depth-adjusted selected region 1040. Since the second image 1050 includes both the region corresponding to the first depth and the region corresponding to the second depth, a user can easily recognize an aperture value of each region through the second indicator 1025.

Referring to FIG. 10 (c), the mobile terminal can sense a third input signal 1033 for the first region 1040. In this instance, the third input signal 1033 may correspond to a drag touch input performed by rubbing the selected region 1040 of the second image 1050. In response to the third input signal 1033, the mobile terminal can control a third image 1060, in which the depth of the selected region is changed into a third depth, to be output. The third depth may correspond to a value higher than the second depth. With respect to this, the same process related to the creation of the second image 1050 can be performed.

Referring to FIG. 10 (d), the mobile terminal can sense a fourth input signal 1034 for the selected region 1040. In this instance, the fourth input signal 1034 may correspond to a drag touch input performed by rubbing the selected region 1040 of the third image 1060. In response to the fourth input signal 1034, the mobile terminal can control a fourth image 1070, in which the depth of the selected region is changed into a fourth depth, to be output. The fourth depth may correspond to a value higher than the third depth. With respect to this, the same process related to the creation of the third image 1060 can be performed.

Meanwhile, if an additional input signal for the aperture icon 1010 is sensed, the mobile terminal ends the depth control mode and can save the fourth image 1070 to a memory. According to the embodiment shown in FIG. 10, each of the second to fourth input signals for controlling the depth to increase gradually can determine the depth according to a level of applying pressure simultaneously together with a drag touch as well as to a count of drag touch.

According to the embodiment shown in FIG. 10, if an input signal is sensed, a mobile terminal adjusts depth of an input signal sensed region. Alternatively, if an input signal is sensed, the mobile terminal can adjust depth of a whole image as well. Through the embodiment shown in FIG. 10, a user can easily change an image in a manner that depth of a partial region of the image gets deeper gradually in proportion to a count of inputs of rubbing a display unit.

Figure 11:
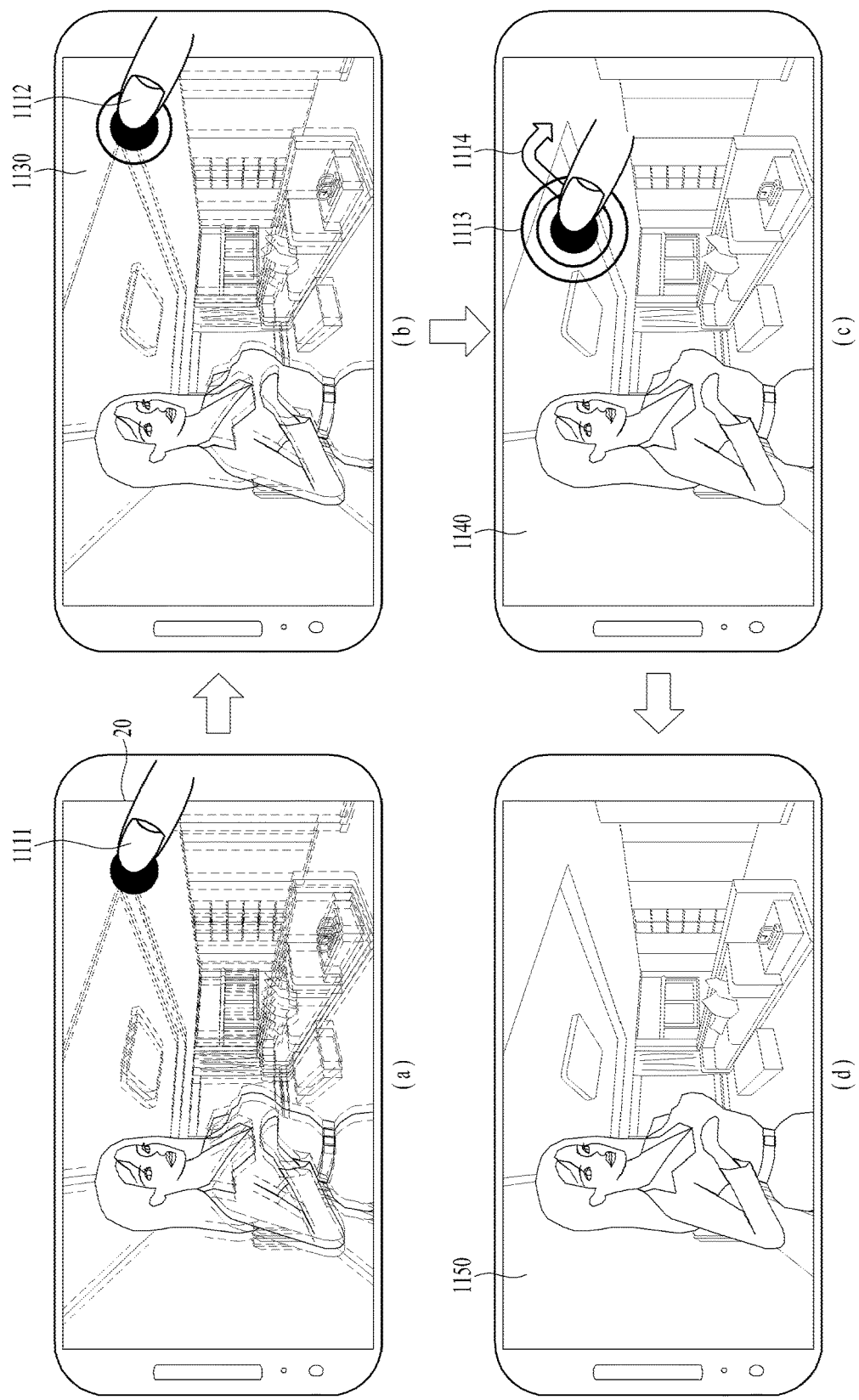
FIG. 11 is a diagram illustrating one example of adjusting depth of an output image output in a mobile terminal according to one embodiment of the present invention.

Next, FIG. 11 is a diagram illustrating one example of adjusting a depth of an output image output in a mobile terminal according to one embodiment of the present invention. Particularly, if an input signal of applying pressure to an image additionally is sensed, FIG. 11 shows a method of adjusting a depth of a whole image. Unlike the former embodiments shown in FIG. 9 and FIG. 10, the embodiment shown in FIG. 11 may correspond to a case that an aperture icon is not output to a first image. Details redundant with the description with reference to FIG. 9 are omitted from the following description.

In addition, while a gallery application is executing, a mobile terminal can output a first image 20 captured at a first depth. According to an embodiment of the present invention, although the first depth corresponds to a digital aperture value, assume that depth is adjusted when an aperture icon is not displayed separately. Referring to FIG. 11 (a), the mobile terminal can sense a first input signal 1111 applied to the first image 20. In this instance, the first input signal 1111 may correspond to a touch input of pressing at a first pressure. Moreover, while an aperture icon is not output, the first input signal 1111 may correspond to a trigger signal for entering a depth control mode.

In response to the first input signal 1111, as shown in FIG. 11 (*b*), the mobile terminal can output a second image 1130, in which the depth of the first image 20 is changed into a second depth, to a display unit. The second depth may correspond to a value higher than the first depth.

With respect to this, in response to the first input signal 1111, the mobile terminal can determine the second depth. If the second depth is determined, the mobile terminal can search a plurality of images related to the first image 20 for an image captured at the second depth or a depth similar to the second depth. The mobile terminal can create a second image 1130 based on the image corresponding to the second depth.

Moreover, the mobile terminal can sense a second input signal for the second image 1130. The second input signal 1112 may correspond to a touch input of pressing at a second pressure. According to the present embodiment, the second pressure of the second input signal 1112 may correspond to a pressure higher than the first pressure of the first input signal 1111.

In this instance, referring to FIG. 11 (*c*), in response to the second input signal 1112, the mobile terminal can output a third image 1140 having the depth of the second image 1130 changed into a third depth to the display unit. The third depth may correspond to a depth value higher than the second depth. With respect to this, the same process related to the creation of the second image 1130 can be performed.

The mobile terminal can sense a third input signal 1113 for a selected region 1120 on the third image 1140. The third input signal 1113 may correspond to a touch input of pressing at a third pressure. According to the present embodiment, the third pressure of the third input signal 1113 may correspond to a pressure higher than the second pressure of the second input signal 1112.

In this instance, in response to the third input signal 1113, the mobile terminal can output a fourth image having the depth of the third image 1140 changed into a third depth to the display unit. The fourth depth may correspond to a depth value higher than the third depth. With respect to this, the same process related to the creation of the second image 1130 can be performed.

Meanwhile, the mobile terminal can sense a fourth input signal 1114 corresponding to a drag touch input of drawing a specific shape on the display unit. The fourth input signal 1114 may correspond to an input for ending a depth control mode. In this instance, as shown in FIG. 11 (*d*), the mobile terminal can control a fourth image 1150 to be output on the gallery application in response to the fourth input signal 1114.

According to the present embodiment, the first to fourth input signals 1111 to 1114 may correspond to one contiguous touch input signals. In particular, a user presses a predetermined region with one touch input signal to control a depth control mode to be entered, changes a depth by applying stepwise pressure, and can then end the depth control mode by applying a drag touch and then detaching the touch. The user checks whether the depth of the first image 20 is changed by applying weak pressure and can then easily check that the depth increases in response to the strength of the pressure by contiguously pressing at stronger pressure.

According to the embodiment shown in FIG. 11, if an input signal is sensed, the mobile terminal adjusts depth of a whole image. Alternatively, if an input signal is sensed, the mobile terminal adjusts depth of an input signal sensed region only and then outputs a corresponding image.

Figure 12:
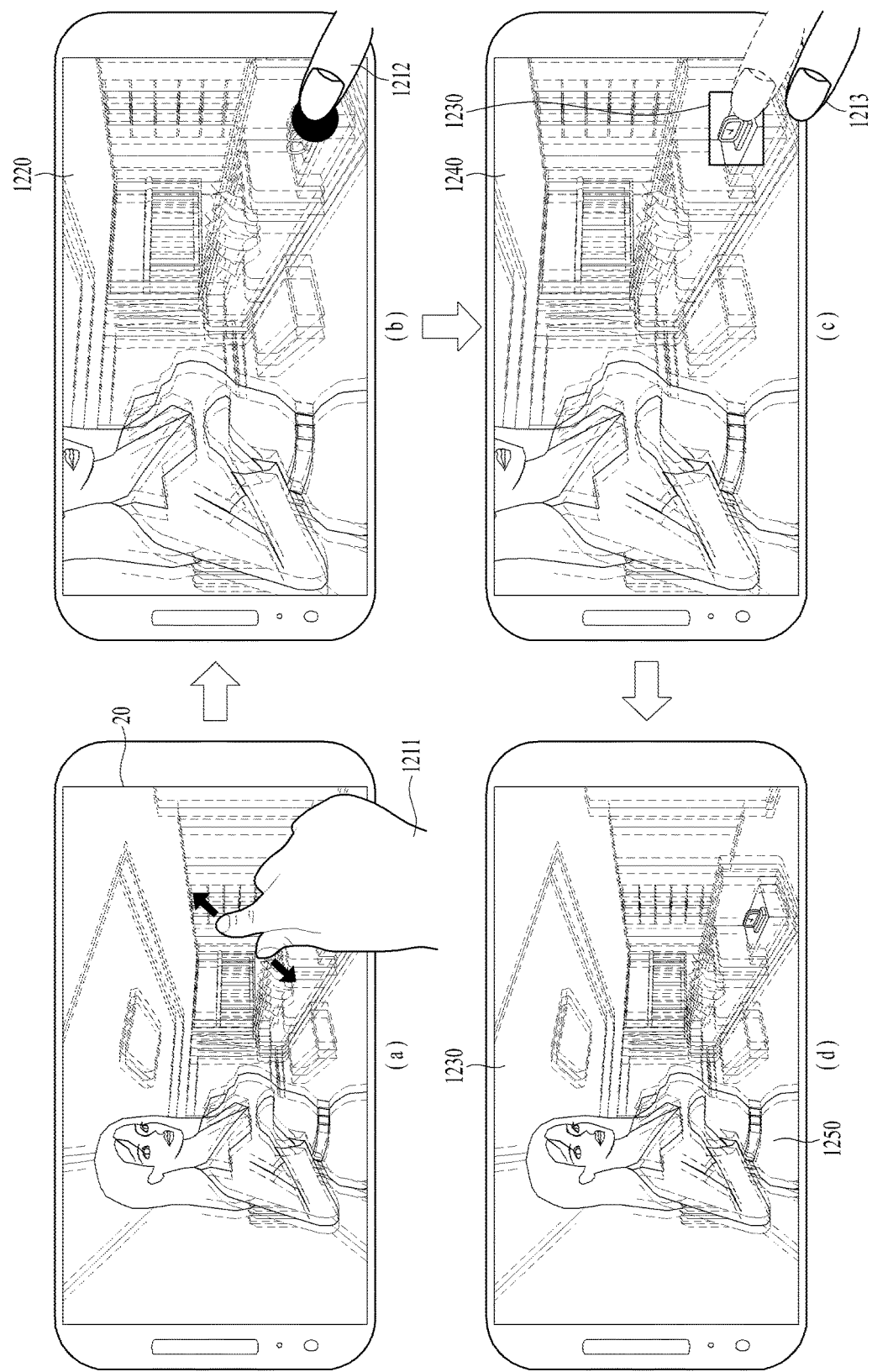
FIG. 12 is a diagram illustrating one example of adjusting depth of an output image output in a mobile terminal according to one embodiment of the present invention.

FIG. 12 is a diagram illustrating one example of adjusting a depth of an output image output in a mobile terminal according to one embodiment of the present invention. Particularly, FIG. 12 shows a method of adjusting a depth in response to a pressure added input signal after enlarging and outputting a partial region of an image. Unlike the former embodiments shown in FIG. 9 and FIG. 10, the embodiment shown in FIG. 12 may correspond to a case that an aperture icon is not output to a first image. Details redundant with the description with reference to FIG. 9 are omitted from the following description.

In addition, while a gallery application is executing, a mobile terminal can output a first image 20 captured at a first depth. According to an embodiment of the present invention, although the first depth corresponds to a digital aperture value failing to be supported by hardware of a camera provided to the mobile terminal, assume that depth is adjusted when an aperture icon is not displayed separately. Referring to FIG. 12 (*a*), the mobile terminal can sense a first input signal 1211 applied to the first image 20. In this instance, the first input signal 1211 may correspond to a pinch-out touch or a double-tap touch. In this instance, referring to FIG. 12 (*b*), the mobile terminal can output a second image 1220 resulting from enlarging a region from which the first input signal 1211 is sensed.

The mobile terminal can sense a second input signal 1212 for the second image 1220. In this instance, the second input signal 1212 may correspond to a touch input of pressing at a first pressure. Moreover, while an aperture icon is not output, the second input signal 1212 may correspond to a trigger signal for entering a depth control mode.

In response to the second input signal 1212, as shown in FIG. 12 (*b*), the mobile terminal can output a third image 1240, in which the depth of a selected region 1230 on the second image 1220 is changed into a second depth, to a display unit. In this instance, the depth of the rest of the region of the third image 1240 except the selected region 1230 corresponds to the first depth. The selected region 1230 may correspond to a region corresponding to a location of the display unit from which the second input signal 1212 is sensed. The selected region 1230 may include a periphery of the sensed region as well as the second input signal sensed location. Further, the second depth may correspond to a value higher than the first depth.

With respect to this, in response to the second input signal 1212, the mobile terminal can determine the second depth. If the second depth is determined, the mobile terminal can search a plurality of images related to the first image 20 for an image captured at the second depth or a depth similar to the second depth. The mobile terminal can extract a region corresponding to the selected region 1230 from an image corresponding to the second depth. The mobile terminal can create a third image 1240 by synthesizing the extracted region corresponding to the selected region 1230 with the first image 20.

Referring to FIG. 12 (*c*), while the third image 1240 is output, the mobile terminal can sense an end of the touch input of the second input signal 1212. In particular, a user checks the image in which the depth of the selected region 1230 has been changed into the second depth and can then detach the touched finger from the display unit. In response to the end of the touch input, the mobile terminal can end the depth control mode. Referring to FIG. 12 (*d*), the mobile terminal can output a fourth image 1250 resulting from reducing the enlarged image by the enlargement rate. In this instance, the selected region 1230 in the fourth image may include an image corresponding to the second depth. Besides, the mobile terminal can save the fourth image 1250 to the gallery application.

Figure 13:
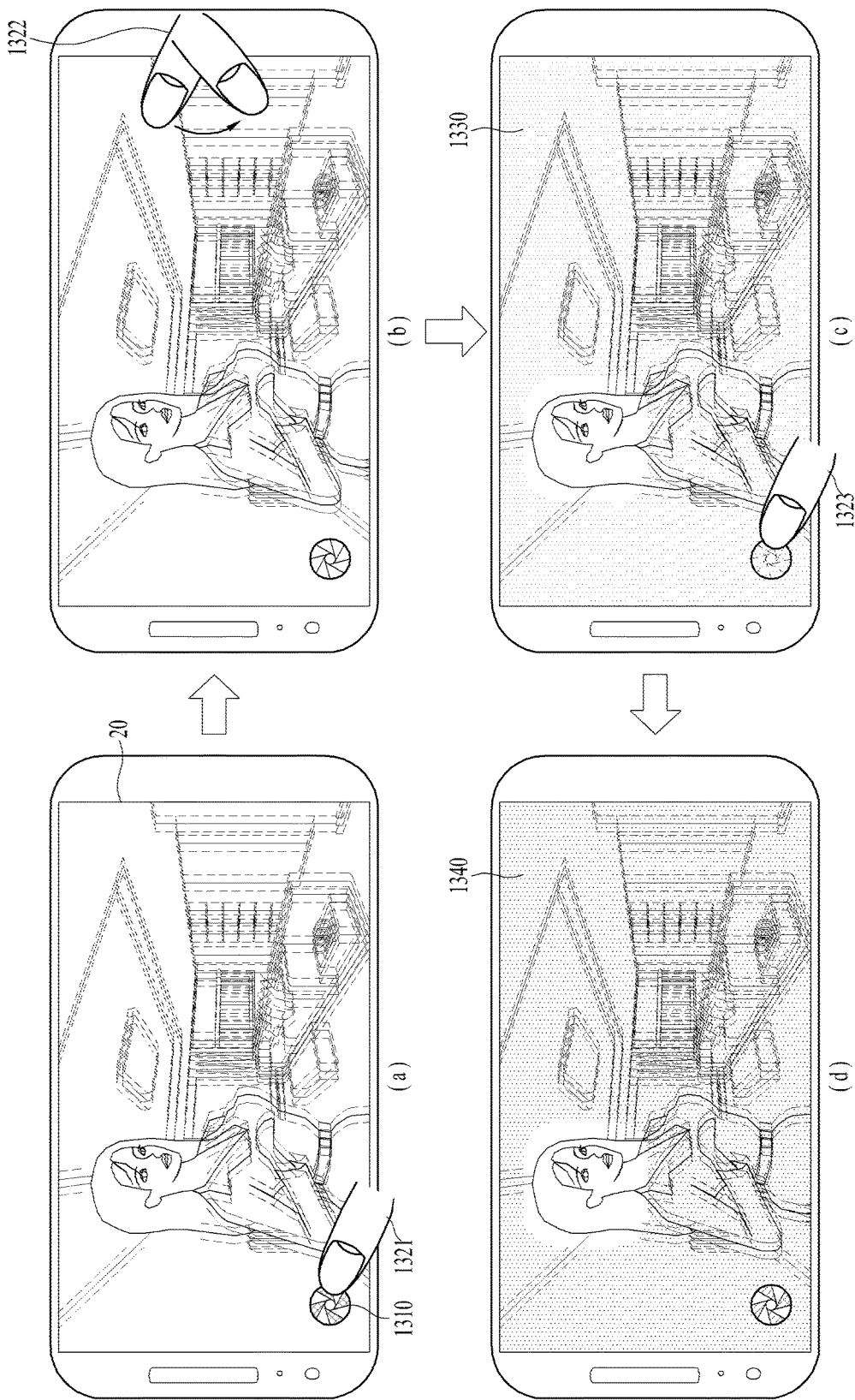
FIG. 13 is a diagram illustrating one example of adjusting color of an output image output in a mobile terminal according to one embodiment of the present invention.

FIG. 13 is a diagram illustrating one example of adjusting color of an output image output in a mobile terminal according to one embodiment of the present invention. Particularly, if an input signal for an image is sensed, FIG. 13 shows a case of adjusting color instead of depth. Details redundant with the description with reference to FIG. 9 are omitted from the following description.

Referring to FIG. 13 (*a*), while a gallery application is executing, a mobile terminal can output a first image 20 captured at a first depth. Further, the mobile terminal can output an aperture icon 1310. The mobile terminal can sense a first input signal 1321 for the aperture icon 1310. The first input signal 1321 may correspond to an input for adjusting color of at least one portion of the first image 20. For instance, the first input signal 1321 may correspond to one of a long and press touch, a double tap touch and the like. According to the embodiments shown in FIG. 9 and FIG. 13, since an input signal for the same aperture icon 1310 is sensed, assume that the input signal for the aperture icon 1310 shown in FIG. 13 is different from that shown in FIG. 9.

The mobile terminal can enter a color control mode in response to the first input signal 1321. If the color control mode is entered, as shown in FIG. 13 (*b*), the mobile terminal can indicate that the color control mode is entered by changing a graphic effect of the aperture icon 1310.

The mobile terminal can sense a second input signal 1322 for a first region 1330 of a display unit in the color control mode. The second input signal 1322 may correspond to a drag touch input of rubbing the first region 1330 of the first image 20. In response to the second input signal 1322, the mobile terminal can control a second image 1340, which results from changing a color of the first region 1330 into black, to be output.

Referring to FIG. 13 (*c*), the mobile terminal can sense a third input signal 1323 for the aperture icon 1310. The third input signal 1323 is a signal for ending the color control mode and may correspond to the same input of the first input signal 1321. In this instance, the mobile terminal can save the second image 1340 to a memory. Moreover, as shown in FIG. 13 (*d*), the mobile terminal can control the second image 1340 to be output to the display unit instead of the first image 20.

Meanwhile, the second image 1340 may be saved to a location next to the first image in the gallery application or may be saved as a separate group. Referring to FIG. 13 (*d*), if the color control mode is ended, the graphic effect of the aperture icon 1310 can be changed again. According to the embodiments shown in FIGS. 8 to 13, based on a plurality of images captured by photographing, a user can post-correct an output image easily and intuitively through such inputs to the output image as a drag touch, a long & press touch and the like.

Plurality of Preview Images Provided by Screen Partition

FIGS. 14 to 17 show methods of outputting preview images respectively sensed by a plurality of cameras simultaneously in case of launching a camera application. According to the embodiments shown in FIGS. 14 to 17, as mentioned in the foregoing description with reference to FIG. 2, assume that an image is sensed in a view angle area of each of a plurality of cameras provided to a rear side of a mobile terminal. Further, assume that a plurality of the cameras including a first camera and a second camera are disposed adjacent to each other on the rear side of the mobile terminal. The first camera and the second camera may correspond to the second camera 121*b* shown in FIG. 2 and the third camera 121*c* shown in FIG. 2, respectively.

Figure 14:
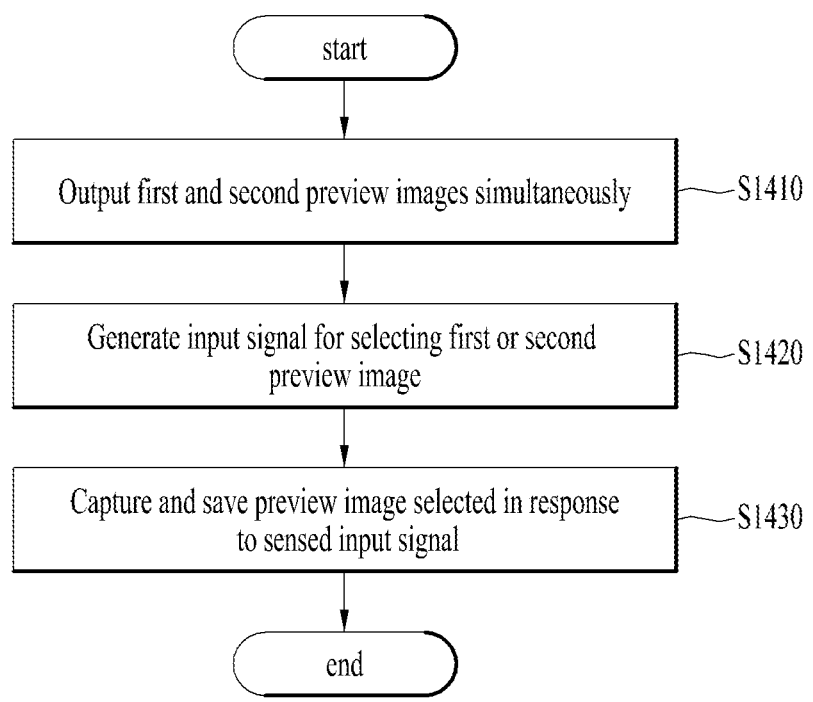
FIG. 14 is a flowchart illustrating a method of providing a plurality of preview images in a mobile terminal according to one embodiment of the present invention.

In particular, FIG. 14 is a flowchart illustrating a method of providing a plurality of preview images in a mobile terminal according to one embodiment of the present invention. As shown, a mobile terminal outputs a first preview image sensed by a first camera to a first region of a display unit and can also output a second preview image sensed by a second camera to a second region of a display unit (S1410). According to an embodiment of the present invention, the first camera and the second camera may correspond to the cameras differing from each other in view angle. For instance, the first camera and the second camera may correspond to a wide angle camera and a narrow angle camera, respectively, by which the present invention is non-limited. For instance, each of the first and second cameras corresponds to either a wide angle camera or a narrow angle camera.

The mobile terminal can sense an input signal for the first or second preview image (S1420). For instance, the input signal may correspond to a touch input for capturing the first or second preview image. In response to the sensed input signal, the mobile terminal can capture and save the first or second preview image (S1430). In particular, the mobile terminal can capture and save an image selected by a user from a plurality of preview images. With respect to this, embodiments are described with reference to FIGS. 15 to 17 as follows.

Figure 15:
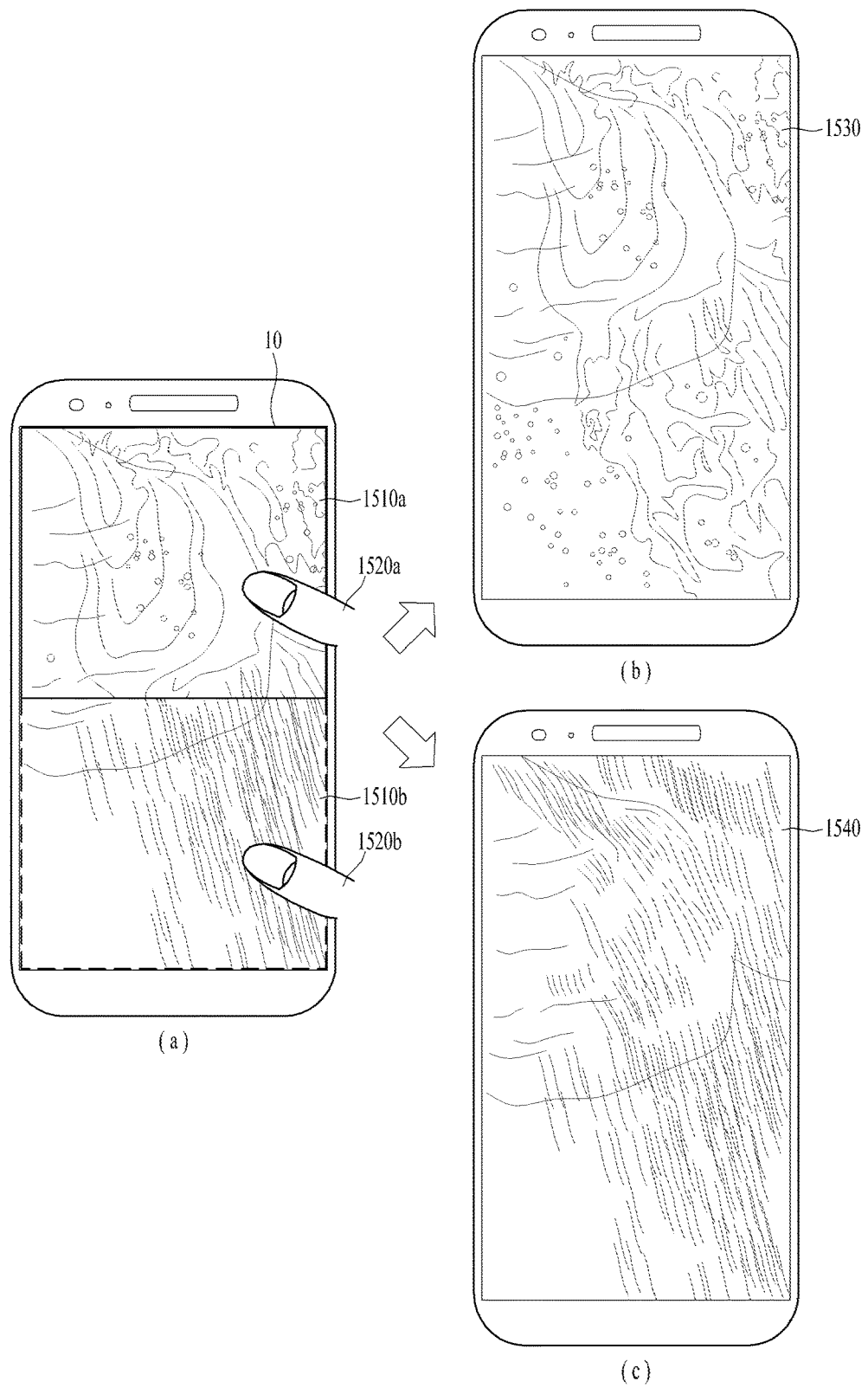
FIG. 15 is a diagram illustrating one example of outputting a plurality of preview images in a mobile terminal according to one embodiment of the present invention.

FIG. 15 is a diagram illustrating one example of outputting a plurality of preview images in a mobile terminal according to one embodiment of the present invention. Particularly, FIG. 15 shows an image capturing method as follows. In addition, a plurality of images having the same brightness despite differing in aperture value are sensed by a plurality of cameras differing from each other in view angle and then provided. If one of a plurality of the preview images is selected, the selected preview image is captured.

According to the present embodiment, assume that a plurality of images sensed by a plurality of cameras have the same brightness but differ from each other in exposure. When an aperture value of one of a plurality of cameras is small, assume that a shutter speed is slow. When an aperture value of another camera is large, assume that a shutter speed is fast.

Referring to FIG. 15 (*a*), while a camera application is executing, a mobile terminal can control a plurality of preview images 10 to be output. A plurality of the preview images 10 include a first preview image 1510*a* and a second preview image 1510*b*. The first and second preview images 1510*a* and 1510*b* may be disposed in width or length direction.

According to the embodiment shown in FIG. 15, the first preview image 1510*a* is an image sensed by a wide angle camera and corresponds to an image having a wide view angle, a small aperture value and a short exposure time. The first preview image 1510*a* may output a whole or part of the image sensed by a first camera. According to the embodiment shown in FIG. 15, the second preview image 1510*b* is an image sensed by a narrow angle camera and corresponds to an image having a narrow view angle, a large aperture value and a long exposure time. The second preview image 1510*b* may output a whole or part of the image sensed by a second camera.

For instance, the mobile terminal can sense an input signal 1520*a* for the first preview image 1510*a*. In this instance, as shown in FIG. 15 (*b*), the mobile terminal captures the image output as the first preview image 1510*a* and can then save the captured image to a memory. Further, the mobile terminal may output the captured image 1530 to the display unit.

In another instance, the mobile terminal can sense an input signal 1520*b* for the second preview image 1510*b*. In this instance, as shown in FIG. 15 (*c*), the mobile terminal captures the image output as the second preview image 1510*b* and can then save the captured image to the memory. Further, the mobile terminal may output the captured image 1540 to the display unit. Unlike the first/second preview image 1510*a*/1510*b*, the captured image 1530/1540 may be output as a full screen to the mobile terminal.

Figure 16:
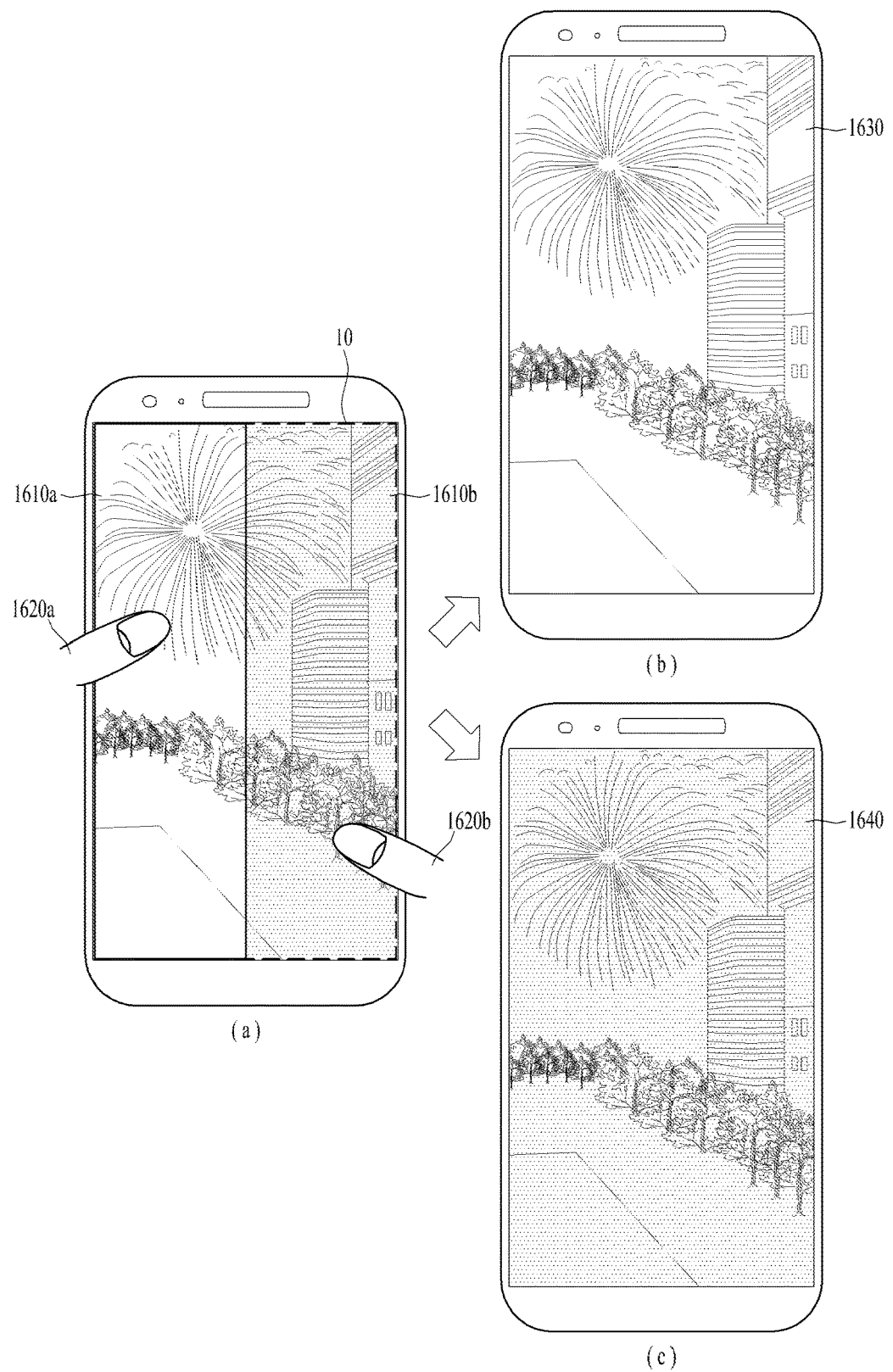
FIG. 16 is a diagram illustrating one example of outputting a plurality of preview images in a mobile terminal according to one embodiment of the present invention.

FIG. 16 is a diagram illustrating one example of outputting a plurality of preview images in a mobile terminal according to one embodiment of the present invention. Particularly, when a plurality of preview images differing from each other in brightness are provided by being sensed by a plurality of cameras, if one of the preview images is selected, FIG. 16 shows a method of capturing the selected preview image. Details redundant with the description with reference to FIG. 15 are omitted from the following description.

According to an embodiment of the present invention, assume that images sensed by a plurality of cameras differ from each other in brightness. For instance, if a plurality of cameras have the same aperture value, one camera corresponds to a case of a fast shutter speed and another camera corresponds to a case of a slow shutter speed. In another instance, if a plurality of cameras have the same shutter speed, one camera corresponds to a case of a small aperture value and another camera corresponds to a case of a large aperture value.

Referring to FIG. 16 (*a*), while a camera application is executing, a mobile terminal can control a plurality of preview images 10 to be output. Particularly, the mobile terminal can output a first preview image 1610*a* sensed by a first camera and a second preview image 1610*b* sensed by a second camera to a first region and a second region, respectively. For instance, each of the first and second cameras may correspond to a narrow angle camera or a wide angle camera. Yet, although the first and second camera have the same view angle range, since the first camera and the second camera differ from each other in disposed location, a view angle area output to the preview image may be different.

According to the embodiment shown in FIG. 16, the first and second preview images 160*a* and 160*b* may correspond to a case of the same exposure time and the different aperture values. For instance, the first preview image 1610*a* may correspond to an image having an exposure time longer than that of the second preview image 1610*b*.

Meanwhile, for instance, the mobile terminal may sense an input signal 1620*a* for the first preview image 1610*a*. In this instance, as shown in FIG. 16 (*b*), the mobile terminal captures the first preview image 1610*a* and then saves it to the memory. Further, the mobile terminal may output the captured image 1630 to the display unit.

In another instance, the mobile terminal may sense an input signal 1620*b* for the second preview image 1610*b*. In this instance, as shown in FIG. 16 (*c*), the mobile terminal captures the second preview image 1610*b* and then saves it to the memory. For example, each of the input signals 1620*a* and 1620*b* may correspond to one of various touch inputs such as a short touch, a long touch and the like. Further, the mobile terminal may output the captured image 1640 to the display unit. Unlike the first preview image 1610*a* or the second preview image 1610*b*, each of the captured images 1630 and 1640 may be output as a full screen to the mobile terminal.

Figure 17:
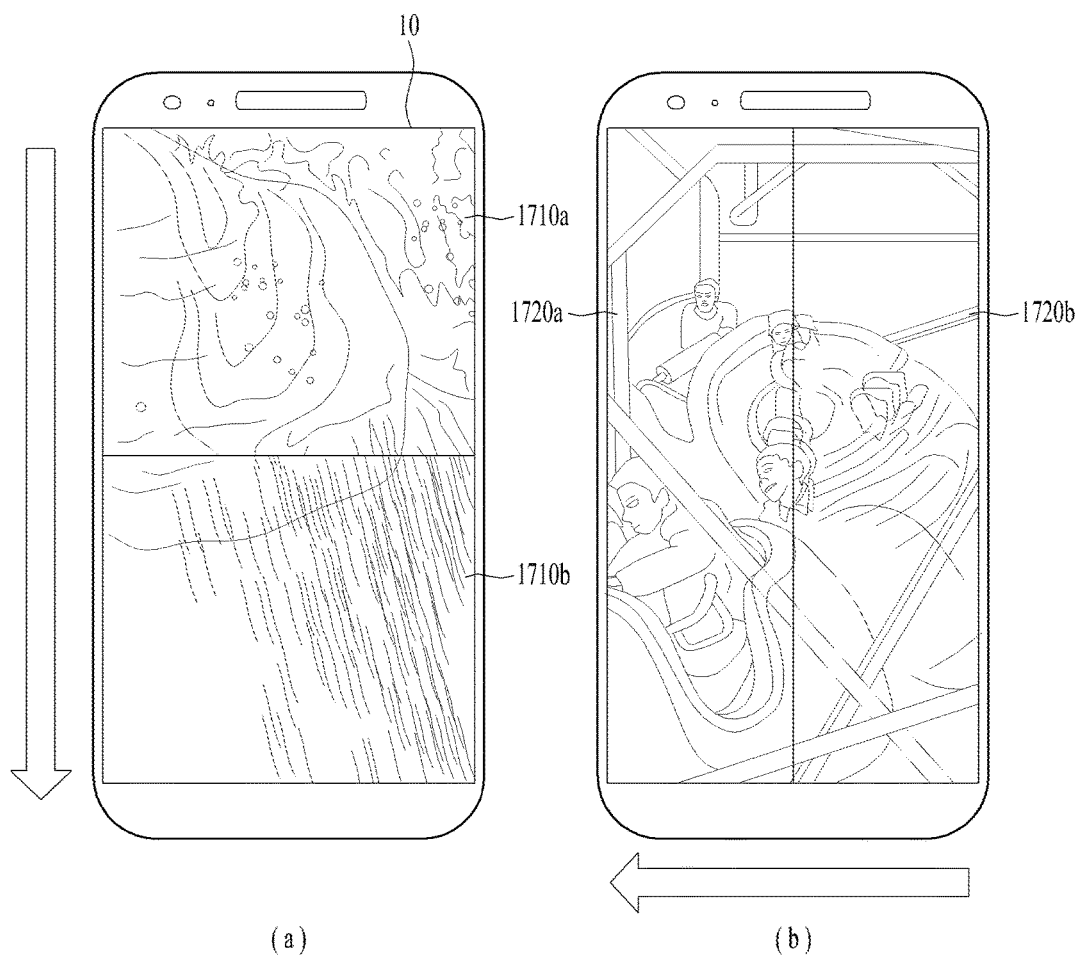
FIG. 17 is a diagram illustrating one example of outputting a plurality of preview images in a mobile terminal according to one embodiment of the present invention.

FIG. 17 is a diagram illustrating one example of outputting a plurality of preview images in a mobile terminal according to one embodiment of the present invention. Particularly, FIG. 17 shows a method of determining screen partition through global motion analysis in disposing regions of a plurality of images sensed by a plurality of cameras provided to a mobile terminal.

For instance, the mobile terminal can sense vertical motion from images sensed by a plurality of cameras. For example, referring to FIG. 17 (*a*), the mobile terminal can sense the movement of water falling in a cascade through a plurality of cameras. In this instance, the mobile terminal can output a plurality of preview images 1710*a* and 1710*b* sensed by a plurality of the cameras by disposing the preview images in length direction.

In another instance, the mobile terminal can sense horizontal (side-to-side) motion from images sensed by a plurality of cameras. For example, referring to FIG. 17 (*b*), the mobile terminal can sense the movement of the rides moving in right and left direction through a plurality of the cameras. In this instance, the mobile terminal can output a plurality of preview images 1720*a* and 1720*b* sensed by a plurality of the cameras by disposing the preview images in width direction.

Besides, screen partition of a plurality of preview images can be determined through various motion analyses. Although the vertical or horizontal screen partition scheme is described with reference to FIG. 17, various screen partition schemes other than the above-described screen partition schemes are available.

Synthesis of Long Exposure Image and Short Exposure Image Through Plurality of Cameras Generally, when a dynamic object is included in a view angle area, if an image is captured by setting a long exposure time, a static object is captured unclearly due to destabilization. The present invention proposes a method of clearly capturing both a static object and a dynamic object included in a view angle area.

Figure 18:
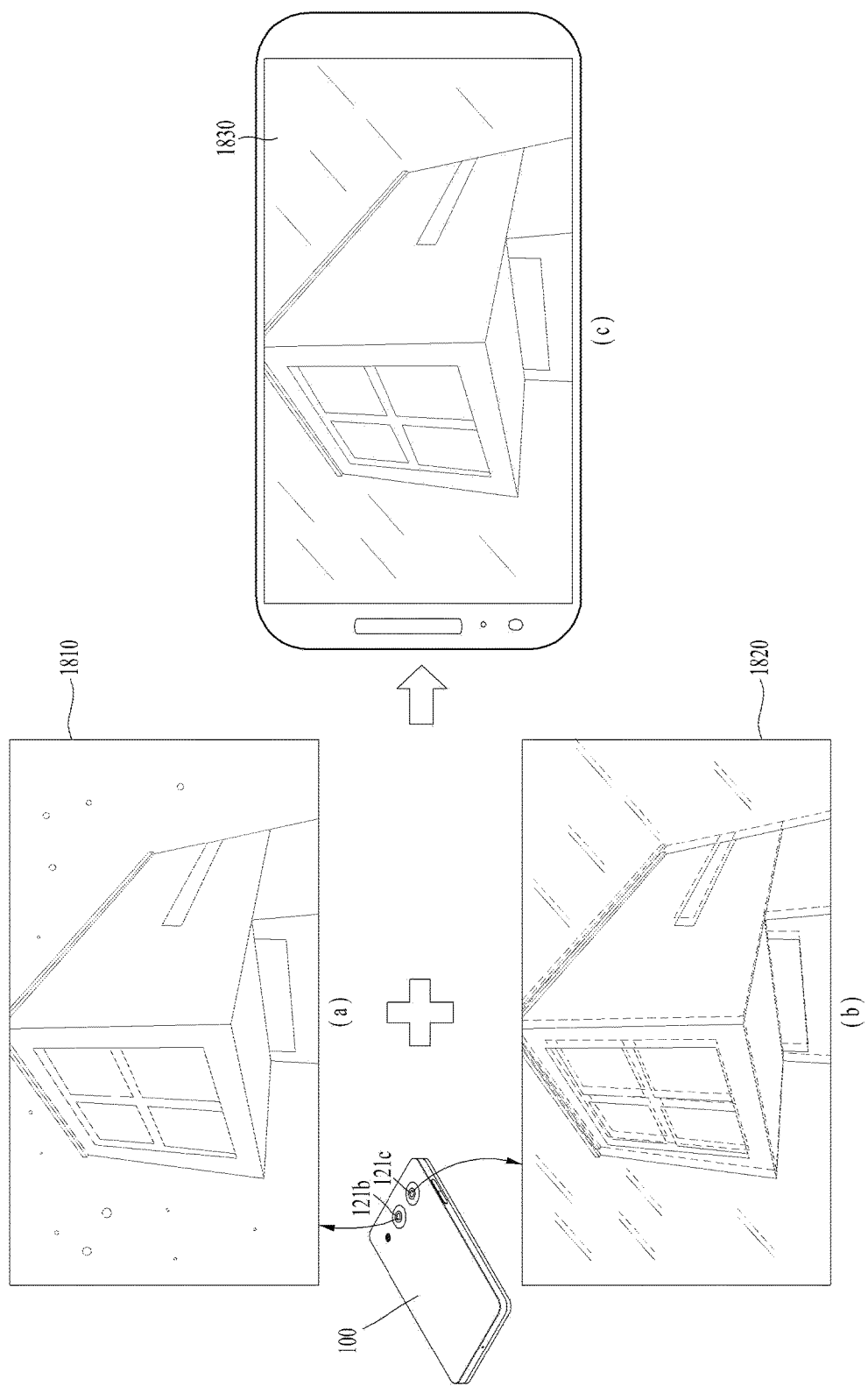
FIG. 18 is a diagram illustrating one example of synthesizing images differing from each other in exposure using a plurality of cameras in a mobile terminal according to one embodiment of the present invention.

FIG. 18 is a diagram illustrating one example of synthesizing images differing from each other in exposure using a plurality of cameras in a mobile terminal according to one embodiment of the present invention. Particularly, if objects sensed by a camera provided to a mobile terminal include both a dynamic object and a static object, FIG. 18 shows a method of capturing both of the dynamic object and the static object clearly through a plurality of cameras.

If a camera application is launched, the mobile terminal can output a preview image sensed by at least one of a plurality of cameras. A plurality of the cameras may correspond to wide or narrow angle cameras having the same view angle range. Yet, although a plurality of the cameras correspond to the cameras having the same view angle range, since the cameras may differ from each other in location disposed on a rear side of the mobile terminal, they may differ from each other in actually sensed view angle area.

While the preview image is output, the mobile terminal can sense an input signal for capture. In this instance, the mobile terminal can capture a plurality of images through first and second cameras provided to the mobile terminal. Referring to FIG. 18 (*a*), a first image 1810 is an image sensed through the first camera and corresponds to the image captured during a short exposure time. Referring to FIG. 18 (b), a second image 1820 is an image sensed through the second camera and corresponds to the image captured during a long exposure time. In particular, since the first camera captures an image at short exposure, an exposure time of the first camera ends before expiration of an exposure time of the second camera. In this instance, assume that the first camera and the second camera include the second camera 121b shown in FIG. 2 and the third camera 121c shown in FIG. 2, respectively.

Since the first image 1810 is the image captured with the short exposure, both a static object and a dynamic object can be captured clearly. Yet, in case of the dynamic object, it is difficult to show motion on the first image 1810. Since the second image 1820 is the image captured with the long exposure, both a static object and a dynamic object can be captured by being destabilized. Yet, in case of the dynamic object, motion can be shown on the second image 1820.

Hence, referring to FIG. 18 (c), the mobile terminal can output a third image 1830 as a captured image by synthesizing a clear region of the static object in the first image 1810 and a region of the second image 1820, in which motion of the dynamic object appears, with each other.

Meanwhile, according to the embodiment shown in FIG. 18, it is described that a plurality of cameras have the same capture start timing point. Yet, one camera starts to capture an image and the other camera can then capture an image at the end of the corresponding exposure. In particular, one camera captures an image by executing long exposure and the other camera can then capture an image with short exposure at the end timing point of the long exposure.

In this instance, if the long exposure image and the short exposure image are synthesized together, a motion trace of the dynamic object may be extracted from the long exposure image and a last shape and location after the motion of the dynamic object may be extracted from the sort exposure image. Through this, although there is not flash, it can obtain an image of the dynamic object (no flash slow sync). Through the above-described embodiment, a mobile terminal can provided both a dynamic object and a static object clearly in one image with a single shot.

HDR Using Plural Cameras

FIGS. 19 to 23 show methods of performing HDR (high dynamic range) using a plurality of cameras provided to a camera. According to HDR, as a bright region range and a dark region range are expanded in an image, brightness and color can be formed as if viewed with real eyes. If HDR is performed, it can provide an image, in which both bright and dark regions in a view angle area are recognizable, by capturing a plurality of images differing in brightness.

Yet, when HDR is performed using a single camera, if an object in a view angle area or a camera moves, differences are generated among a plurality of images. Since HDR assumes that only brightness is different between images corresponding to the same view angle area, if a difference in view angle area is generated between images as well as the inter-image brightness difference, synthesis may be difficult.

Therefore, the present invention provides a method of performing HDR using a plurality of cameras. In particular, the present invention provides a method of performing HDR by simultaneously capturing a plurality of images differing in brightness by assigning the same shutter speed and different aperture values to a plurality of cameras provided to a mobile terminal.

Figure 19:
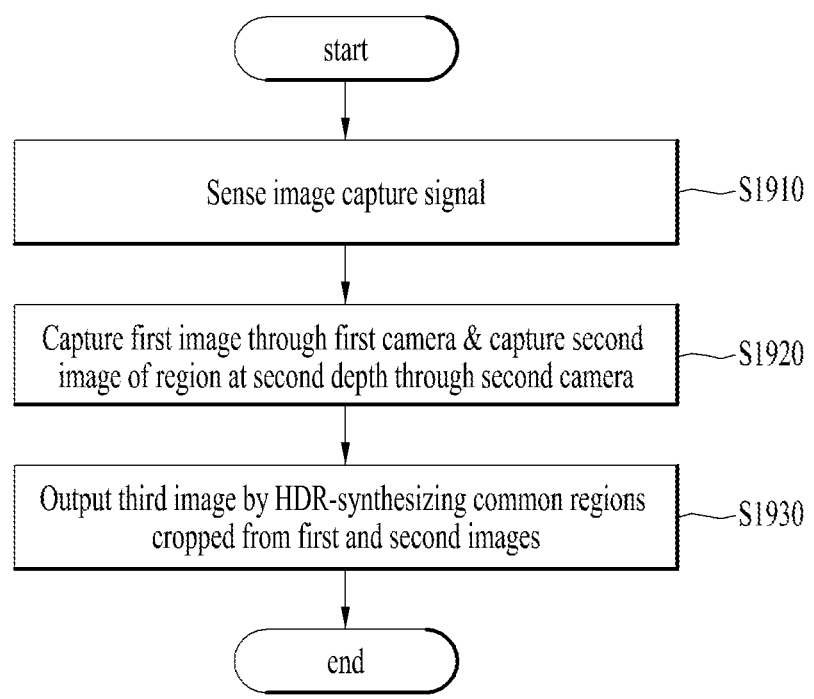
FIG. 19 is a flowchart illustrating a method of performing HDR using images sensed by a plurality of cameras in a mobile terminal according to one embodiment of the present invention.

FIG. 19 is a flowchart illustrating a method of performing HDR using images sensed by a plurality of cameras in a mobile terminal according to one embodiment of the present invention. As shown, while a camera application is executing, a mobile terminal can sense an input signal for image capture (S1910). Particularly, while HDR function is activated on the camera application, an input signal for image capture can be sensed. For instance, while at least one of images sensed by a plurality of cameras is output as a preview image, the mobile terminal can sense an input signal. The output preview image may be implemented into the same as the embodiments shown in FIGS. 14 to 17.

In this instance, the mobile terminal can capture a plurality of images simultaneously through a first camera and a second camera (S1920). Particularly, the mobile terminal can obtain a first image of capturing a first view angle area with a first aperture value through the first camera and a second image of capturing a second view angle area with a second aperture value through the second camera. Further, both of the first image and the second image can be obtained simultaneously.

The mobile terminal can output a third image created based on the first and second images (S1930). Particularly, the mobile terminal can create the third image by cropping the first and second images along a common region between the first and second images and then HDR synthesizing the cropped first and second images together. With respect to this, embodiments are described with reference to FIGS. 20 to 23 as follows.

Figure 20:
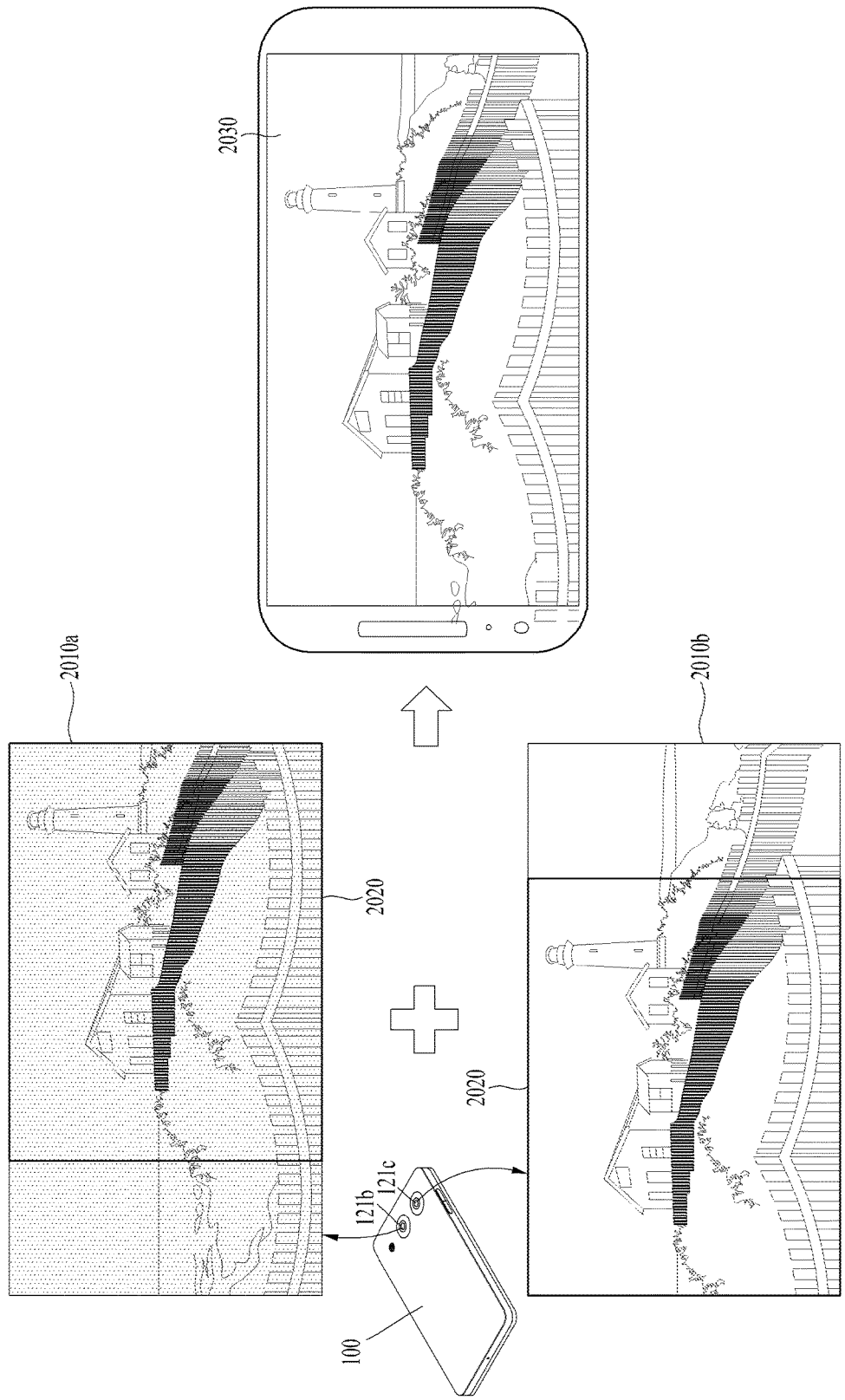
FIG. 20 is a diagram illustrating one example of performing HDR synthesis through a plurality of cameras provided to a mobile terminal according to one embodiment of the present invention.

FIG. 20 is a diagram illustrating one example of performing HDR synthesis through a plurality of cameras provided to a mobile terminal according to one embodiment of the present invention. While a camera application is executing, a mobile terminal can capture an image by activating HDR function. According to an embodiment of the present invention, as shown in FIG. 20, assume that a first image 2010a sensed through a second camera 121b and a second image 2010b sensed through a third camera 121c are captured. As each of the second and third cameras 121b and 121c is set to have the same shutter speed, the first and second images 2010a and 2010b correspond to the images captured simultaneously.

In this instance, the first image 2010a corresponds to an image captured with a first aperture value and the second image 2010b corresponds to an image captured with a second aperture value. For instance, according to the embodiment shown in FIG. 20, the first aperture value is greater than the second aperture value. Hence, the first image 2010a may be captured in a manner that a dark region is unclear due to underexposure. Further, the second image 2010b may be captured in a manner that a bright region is saturated due to overexposure.

The mobile terminal extracts a common region 2020 containing a common object from the first image 2010a and the second image 2010b, crops the common region 2020 from the first image 2010a, and also crops the common region 2020 from the second image 2010b. Subsequently, the mobile terminal can create a third image 2030 by HDR synthesizing the common region 2020 of the first image 2010a and the common region 2020 of the second image 2010b together.

In this instance, as shown in FIG. 20, the mobile terminal can output the third image 2030 to the display unit as an image captured owing to activation of HDR function. The above-mentioned process related to the crop & HDR synthesis operates in the background. Further, a foreground operation of the camera application can actually output the HDR-synthesized image right after capturing an image.

Figure 21:
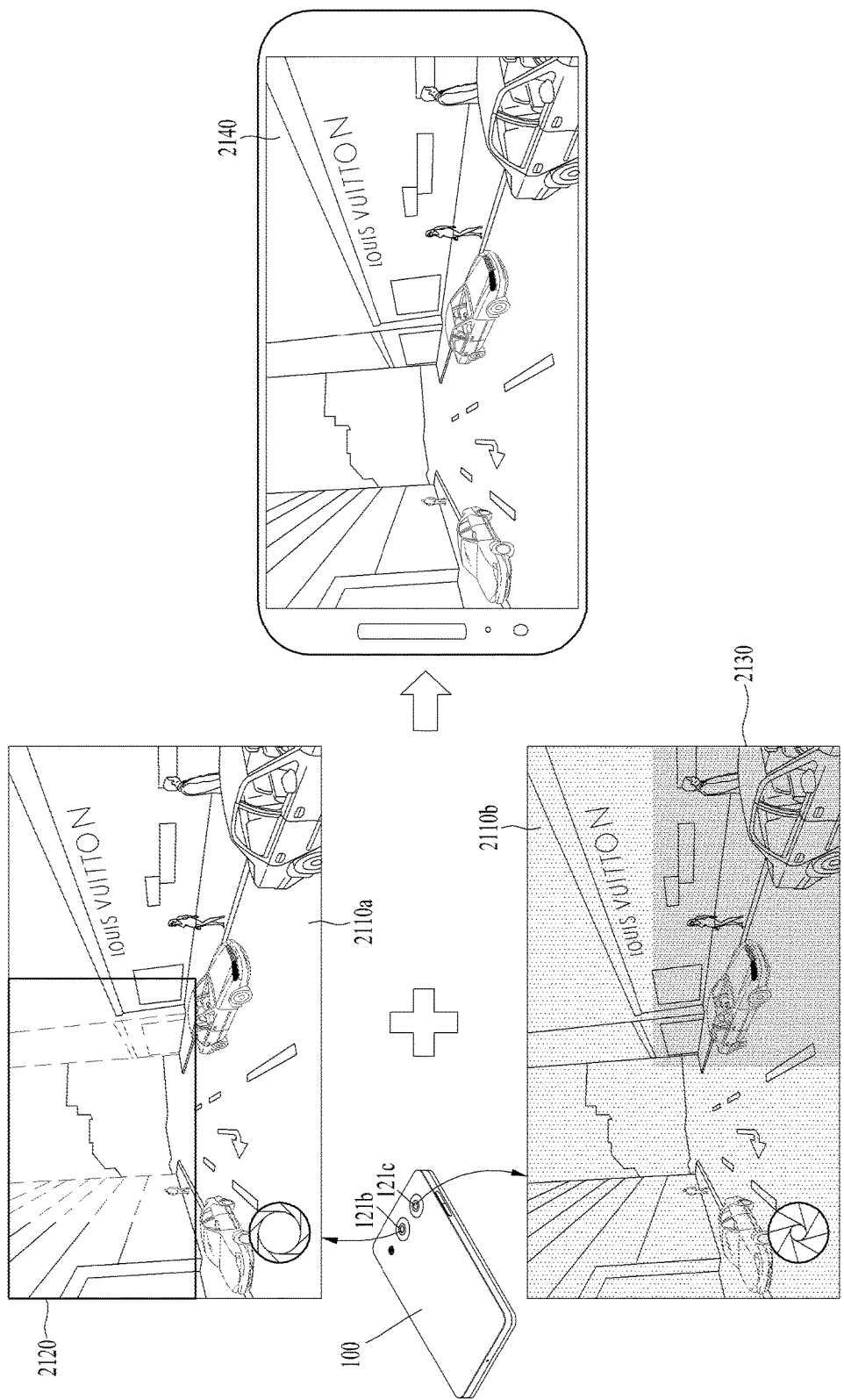
FIG. 21 is a diagram illustrating one example of performing HDR synthesis through a plurality of cameras in a mobile terminal according to one embodiment of the present invention.

FIG. 21 is a diagram illustrating one example of performing HDR synthesis through a plurality of cameras in a mobile terminal according to one embodiment of the present invention. Particularly, FIG. 21 shows a method of capturing an image by setting different aperture values of a plurality of cameras having the same view angle range and then performing HDR synthesis. According to the embodiment shown in FIG. 21, a plurality of cameras may correspond to the same narrow angle cameras or the same wide angle cameras. In the following description of the embodiment shown in FIG. 21, details redundant with those described with reference to FIG. 20 are omitted.

First of ally, while HDR function is activated, a mobile terminal can sense an input signal for image capture. Moreover, while a preview image is output to a display unit, the mobile terminal can sense an input signal for image capture. For instance, the preview image may correspond to at least one of a plurality of images sensed through a first or second camera.

In response to the input signal, the mobile terminal can capture a first image 2110 and a second image 2110b. The first image 2110a shown in FIG. 21 (a) and the second image 2110b are not output to a display unit of the mobile terminal and can be used for the usage of HDR synthesis only.

In this instance, the first image 2110a corresponds to an image captured with a first aperture value through a first camera 121b. Referring to FIG. 21 (a), when an aperture of the first image 2110a is open to the maximum, the first aperture value may correspond to a minimum aperture value. The second image 2110b corresponds to an image captured with a second aperture value through a second camera 121c. referring to FIG. 21 9B), when an aperture of the second image 2110b is open slightly, the second aperture value may correspond to a value greater than the first aperture value. The first and second images 2110a and 2110b correspond to the images simultaneously captured at the same shutter speed. For instance, the first and second aperture values may be set by a user or may correspond to automatically set values.

Meanwhile, although FIG. 21 shows that each of the first and second images 2110a and 2110b has the same view angle area, since the first and second images 2110a and 2110b are not the images captured by the same camera, the first and second images 2110a and 2110b may differ from each other in actually captured view angle area. In this instance, the mobile terminal crops common regions common to the first and second images 2110a and 2110b and can then perform HDR synthesis thereon.

Since an aperture value of the first image 2110a is set low, the first image 2110a may include an overexposure region 2120 having one portion of an object saturated. Since an aperture value of the second image 2110b is set high, the second image 2110b may include an underexposure region 2130 in which a portion of the object is dark.

Based on the common region of the first image 2110a and the common region of the second image 2110b, the mobile terminal can create a third image 2140. Moreover, as shown in FIG. 21 (c), the mobile terminal can output the third image 2140 as a result of image capture in the HDR function activated state. The third image 2140 corresponds to an image created from HDR synthesizing the first and second images 2110a and 2110b. Moreover, the third image 2140 can be output in a manner that objects in the first and second regions 2120 and 2130 are clear and recognizable.

Figure 22:
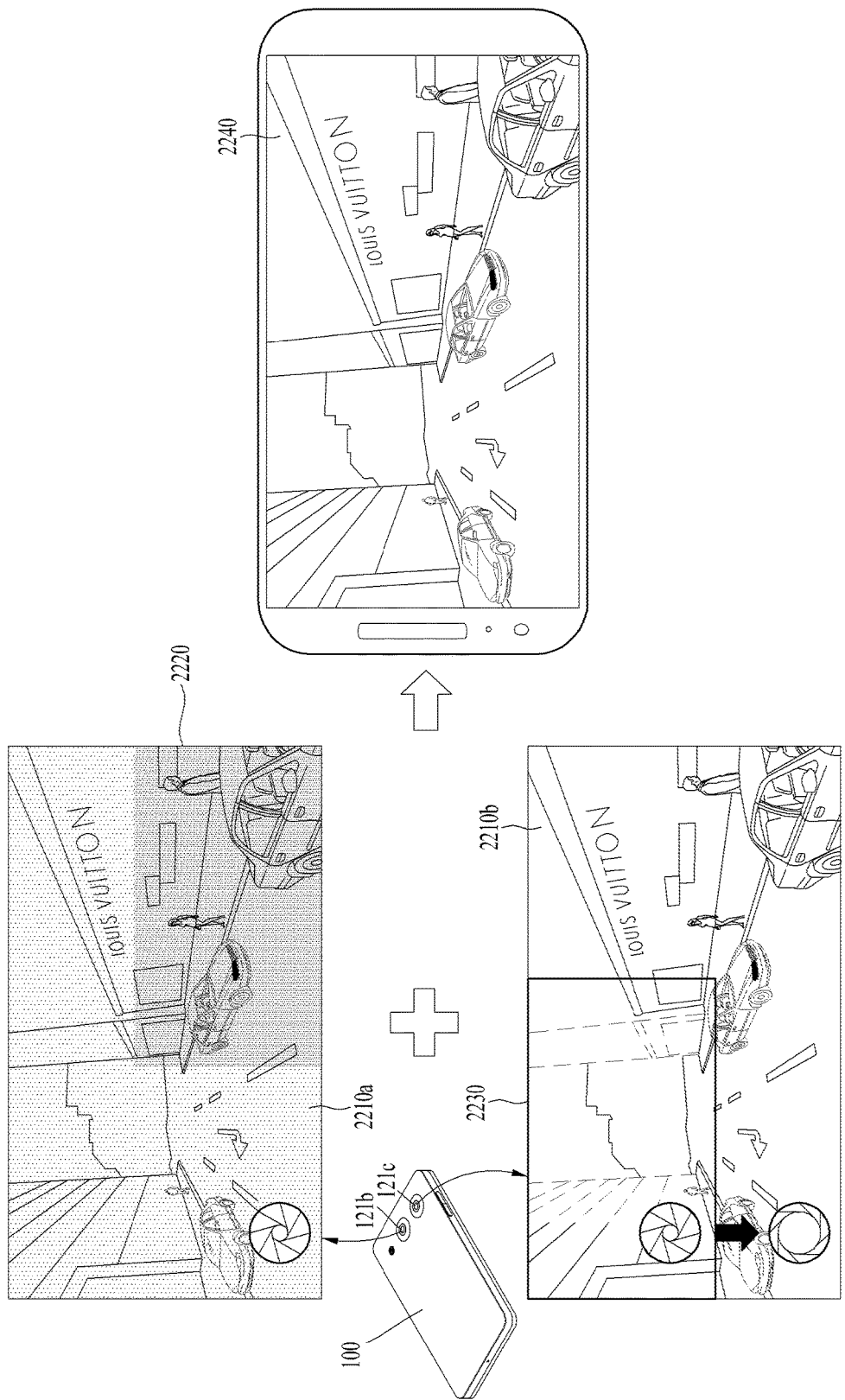
FIG. 22 is a diagram illustrating one example of performing HDR synthesis through a plurality of cameras in a mobile terminal according to one embodiment of the present invention.

FIG. 22 is a diagram illustrating one example of performing HDR synthesis through a plurality of cameras in a mobile terminal according to one embodiment of the present invention. Particularly, FIG. 22 shows a method of capturing images by setting a plurality of cameras having the same view angle range at different aperture values and then performing HDR synthesis. Unlike the former embodiment shown in FIG. 21, the embodiment shown in FIG. 22 corresponds to a case that an aperture value of one of a plurality of cameras is constant. In the following description of the embodiment shown in FIG. 22, details redundant with those described with reference to FIG. 21 are omitted.

If an input signal for image capture is sensed, a mobile terminal can capture a first image 2210a shown in FIG. 22 (a) and a second image 2210b shown in FIG. 22 (b). In this instance, the first image 2210a corresponds to an image captured with a first aperture value through a first camera 121b. Assume that the first aperture value is always a fixed value.

Further, the second image 2210b corresponds to an image captured with a second aperture value through a second camera 121c. In this instance, the second aperture value may correspond to an aperture value capable of recognizing an underexposure region of an image sensed with the first aperture value.

For instance, if an underexposure region in the first image 2210a sensed with the first aperture value is equal to or greater than a preset rate, the mobile terminal can capture the second image 2210b by setting the second aperture value of the second camera at a small value. In another instance, if an underexposure region 2220 in the first image 2210a sensed with the first aperture value is equal to or greater than a preset rate, the mobile terminal can capture the second image 2210b by setting the second aperture value of the second camera at a small value. The second image 2210b may include an overexposure region 2230. Meanwhile, the first image 2210a and the second image 2210b correspond to the images simultaneously captured at the same shutter speed.

Although FIG. 22 shows that view angle areas of the first image 2210a and the second image 2210b are equal to each other, since the first and second cameras are disposed adjacent to each other but fail to be disposed at the same location, the view angle areas are actually different from each other. Hence, the mobile terminal can additionally perform a step of cropping common regions from the first and second images 2210a and 2210b.

Based on the common region of the first image 2210a and the common region of the second image 2210b, the mobile terminal can create a third image 2220. Moreover, referring to FIG. 22 (c), the mobile terminal can output the third image 2220 as a result of image capture in HDR function activated state.

Figure 23:
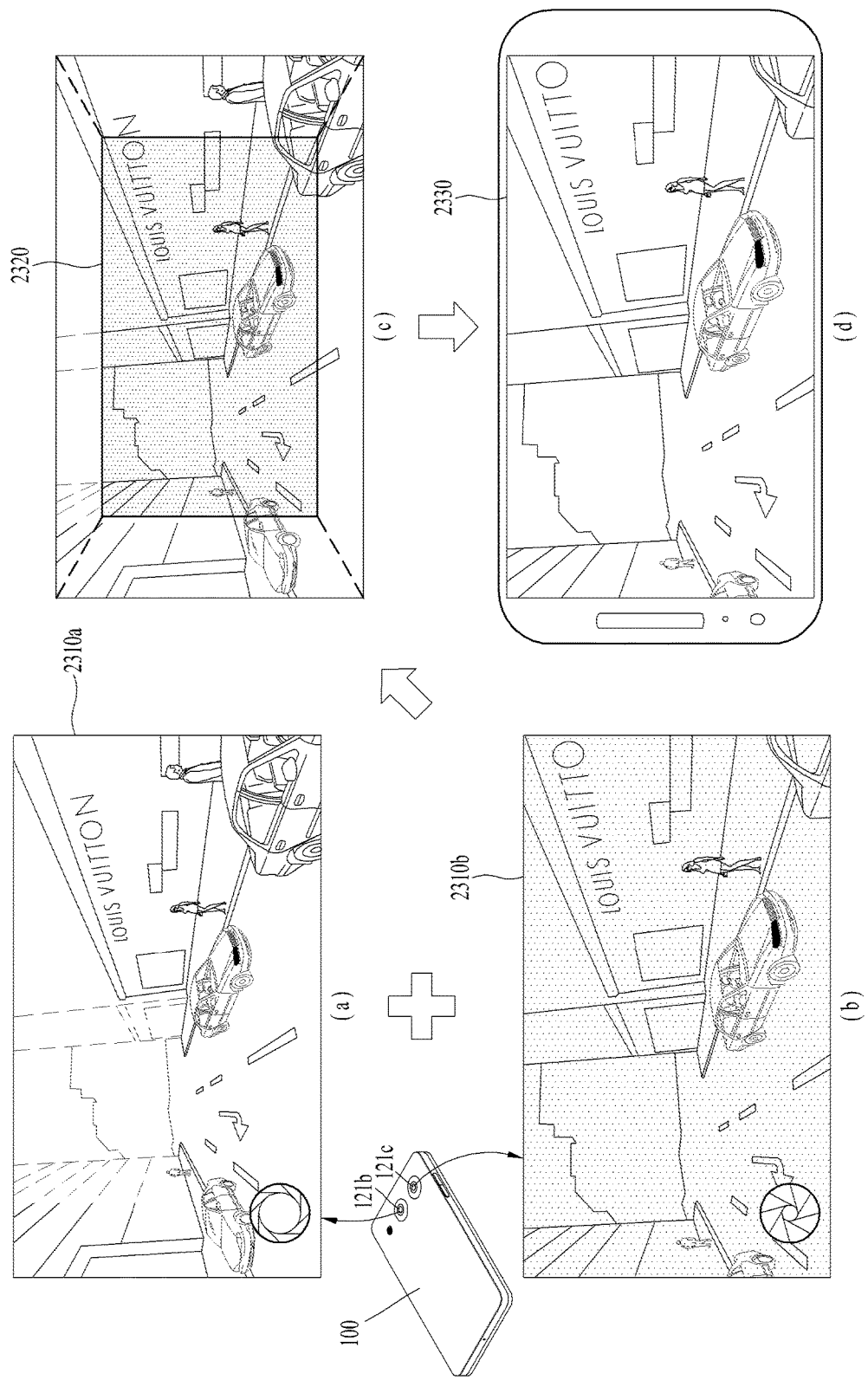
FIG. 23 is a diagram illustrating one example of performing HDR synthesis through a plurality of cameras in a mobile terminal according to one embodiment of the present invention.

FIG. 23 is a diagram illustrating one example of performing HDR synthesis through a plurality of cameras in a mobile terminal according to one embodiment of the present invention. Particularly, FIG. 23 shows a method of capturing images by setting a plurality of cameras having different view angle ranges at different aperture values and then performing HDR synthesis. In the embodiment shown in FIG. 23, a plurality of the cameras may include a wide angle camera and a narrow angle camera. In the following description of the embodiment shown in FIG. 23, details redundant with those described with reference to FIG. 21 are omitted.

If an input signal for image capture is sensed, a mobile terminal can capture a first image 2310a shown in FIG. 23 (a) and a second image 2310b shown in FIG. 23 (b). In this instance, the first image 2310a corresponds to an image captured with a first aperture value through a first camera 121b. Assume that the first aperture value is always a fixed value.

Further, the second image 2310b corresponds to an image captured with a second aperture value through a second camera 121c. In this instance, the second aperture value may correspond to an aperture value capable of recognizing a saturated region of an image sensed with the first aperture value. For instance, if an overexposure region in the first image 2310a sensed with the first aperture value is large, the mobile terminal can capture the second image 2310b by setting the second aperture value of the second camera at a large value. In another instance, if an underexposure region in the first image 2310a sensed with the first aperture value is large, the mobile terminal can capture the second image 2310b by setting the second aperture value of the second camera at a small value. Meanwhile, the first image 2310a and the second image 2310b correspond to the images simultaneously captured at the same shutter speed. Although the first aperture value is described as a fixed value in the embodiment shown in FIG. 23, the second aperture value may be a fixed value to the contrary.

Referring to FIG. 23 (a) and FIG. 23 (b), view angles of the first and second images 2310a and 2310b are different from each other. Particularly, the first image 2310a is an image captured by a wide angle camera having a wide view angle, while the second image 2310b is an image captured by a narrow angle camera having a narrow view angle. Hence, as shown in FIG. 23 (b), the mobile terminal can extract a common region 2320 of the first and second images 2310a and 2310b for HDR synthesis.

Besides, in case of the wide angle camera, lens distortion may be generated. Hence, the mobile terminal can perform lens distortion correction on the first image 2310a captured by the wide angle camera. In this instance, the lens distortion correction can be performed by one of various distortion correcting methods that can be performed by those skilled in the art to which the present invention pertains. The cases shown in FIGS. 23 (a) to 23 (c) may be performed in the background instead of being output to the mobile terminal.

Based on the common region of the first image 2310a and the common region of the second image 2310b, the mobile terminal can create a third image 2330. Moreover, referring to FIG. 23 (d), the mobile terminal can output the third image 2330 as a result of image capture in HDR function activated state. Through FIGS. 19 to 23, if HDR synthesis is performed based on a plurality of images captured at the same timing, since an object sensed in a view angle area is maintained uniformly, it can provide HDR image synthesized more accurately.

Selfie Focusing Through Adjustment of Aperture Value of Front Camera

In case of capturing an image including a plurality of objects through a camera provided to a front side of a mobile terminal, FIGS. 24 to 28 show a method of performing focusing on various objects by adjusting an aperture value of the front camera.

In case of a front camera provided to a related art mobile terminal, a fixed focus and a fixed aperture value are set. In order to give a focusing effect to a character sensed by a camera, it may happen that a background is blurred by post-correction on a captured image instead of performing correction at a timing of capturing an image. The present invention intends to propose a front camera of a mobile terminal capable of adjusting an aperture value. Although embodiments shown in FIGS. 24 to 28 describe a case of sensing an image through a front camera, the embodiments are applicable to a case of sensing an image through a rear camera.

Figure 24:
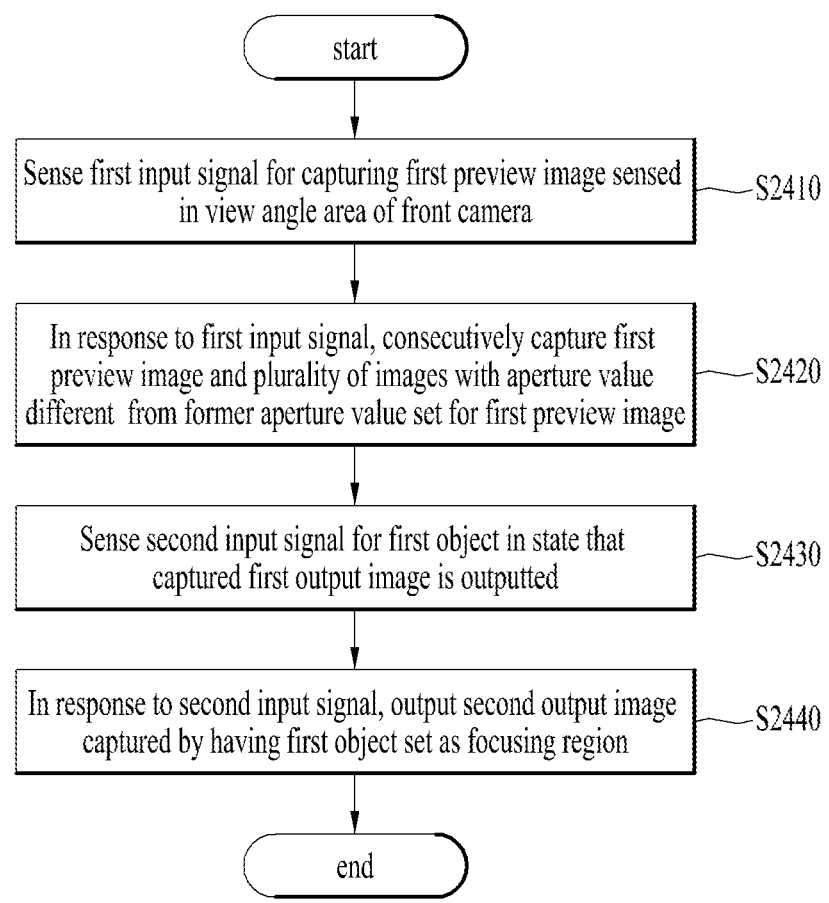
FIG. 24 is a flowchart illustrating a focusing method through a front camera capable of adjusting an aperture value in a mobile terminal according to one embodiment of the present invention.

FIG. 24 is a flowchart illustrating a focusing method through a front camera capable of adjusting an aperture value in a mobile terminal according to one embodiment of the present invention. As shown, while a first preview image sensed through a front camera is output, a mobile terminal can sense a first input signal for capture (S2410). For instance, the first preview image may correspond to an image output on a camera application in a manner that a first aperture value is set.

In response to the first input signal, the mobile terminal can consecutively capture the first preview image and at least one image having an aperture value set differently for the same view angle area of the first preview image (S2420). Further, the mobile terminal can extract and save sharpness data per region for each of a plurality of images.

While a first output image is output, the mobile terminal can sense a second input signal for a first object (S2430). Particularly, while the first output image is output after capture, the mobile terminal can sense a second input signal for selecting at least one of a plurality of objects included in the first output image. For instance, the first output image may correspond to an image corresponding to the first preview image. For instance, the first output image may correspond to an image having the same view angle area of the first preview image and an aperture value different from that of the first preview image.

In this instance, the mobile terminal can output a second output image captured in a manner that the first object is set as a focusing region (S2440). With respect to this, based on the saved sharpness data per region, the mobile terminal can search for an image in which the first object is captured as the focusing region. The mobile terminal extracts a region corresponding to the first object from the found image and can then create a second output image by synthesizing the extracted region with the first output image. With respect to this, embodiments are described with reference to FIGS. 24 to 28.

Figure 25:
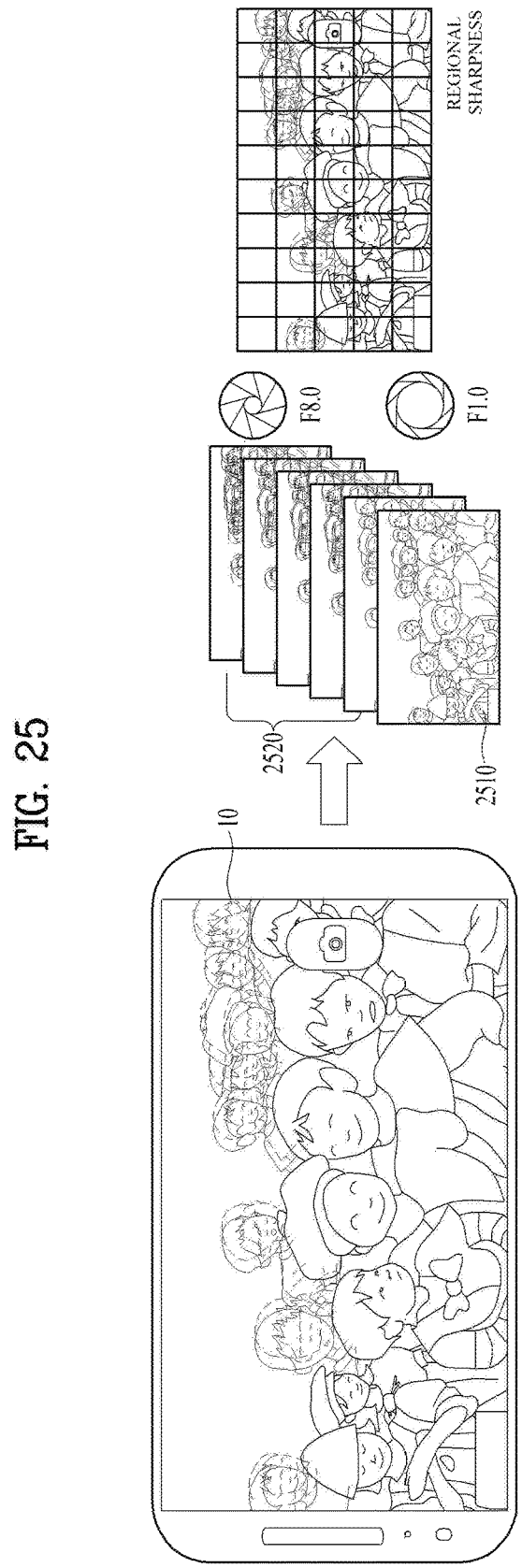
FIG. 25 is a diagram illustrating one example of capturing a plurality of images in case of capturing image through a front camera in a mobile terminal according to one embodiment of the present invention.

FIG. 25 is a diagram illustrating one example of capturing a plurality of images in case of capturing image through a front camera in a mobile terminal according to one embodiment of the present invention. Referring to FIG. 25 (a), if a camera application is launched, a mobile terminal can output a first preview image 10 sensed through a front camera to a display unit. Further, the output first preview image 10 may correspond to an image set with a first aperture value. As mentioned in the foregoing description with reference to FIG. 5, an aperture value can include a digital aperture value implementable by software as well as an aperture value implementable by hardware.

The first preview image 10 may correspond to an image containing a plurality of objects. According to the embodiment shown in FIG. 25, a plurality of the objects may correspond to characters. In this instance, the mobile terminal sets a preset region as a focusing region and can then display the rest region as an output-focusing region. for instance, the preset region may correspond to a character in the closest distance from the mobile terminal.

The mobile terminal can sense an input signal 2510 for capturing the first preview image. In this instance, as shown in FIG. 25 (b), the mobile terminal can consecutively capture at least one or more images 2520 set at an aperture value different from the first aperture value as well as a first output image 2510 corresponding to the first preview image 10.

Further, the at least one or more images 2520 may differ from each other in high sharpness region within the corresponding image as the aperture value differs from that of the first output image 2510. Hence, referring to FIG. 25 (*b*), the mobile terminal sorts the first output image 2510 and a plurality of the images 2520 by regions and can then save a high sharpness image per region.

FIG. 26 is a diagram illustrating one example of setting an aperture value in case of capturing image through a front camera in a mobile terminal according to one embodiment of the present invention. As mentioned in the foregoing description, an aperture value of a front camera of a mobile terminal is adjustable. Hence, without performing post-correction for clarifying an object after capturing an image through a front camera, while a preview image is output, it can perform aperture value adjustment for photographing the object clearly.

For instance, a mobile terminal can perform aperture value adjustment in auto mode. For instance, referring to FIG. 26 (*a*), the mobile terminal determines an aperture value capable of setting a focusing region on the most objects among a plurality of objects included in a preview image and can then adjust an aperture value of the preview image into the determined aperture value.

In another instance, the mobile terminal can perform aperture value adjustment in manual mode. For instance, referring to FIG. 26 (*b*), the mobile terminal outputs an aperture control bar 2610 and can then adjust an aperture value of a preview image based on user's input signal sensed aperture value.

Figure 27:
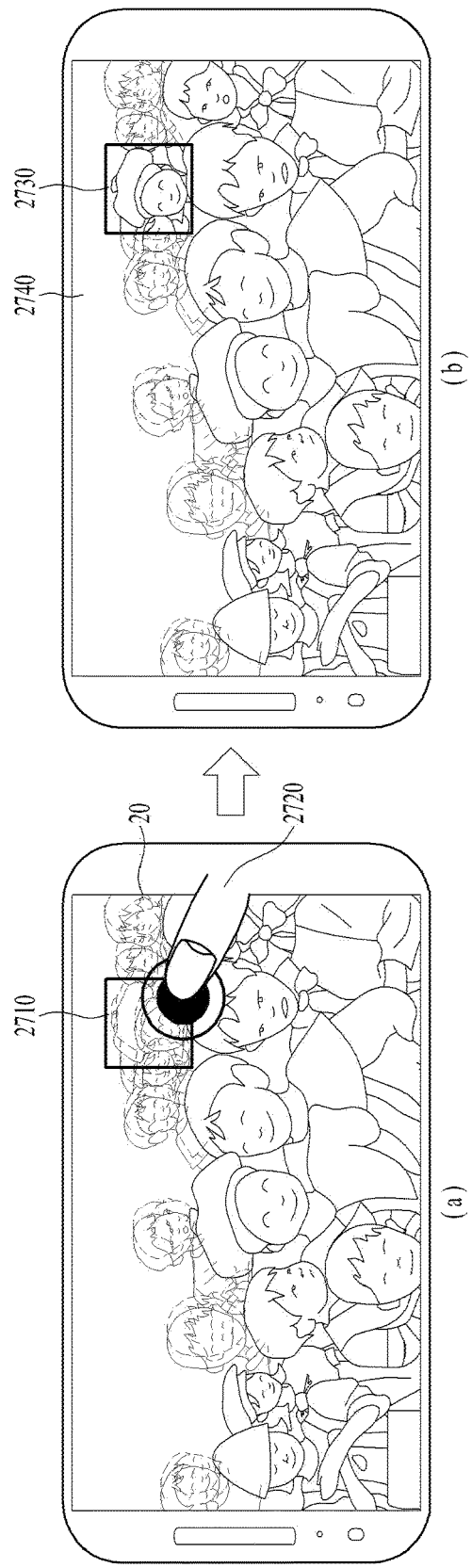
FIG. 27 is a diagram illustrating one example of adjusting depth of an image captured through a front camera in a mobile terminal according to one embodiment of the present invention.

FIG. 27 is a diagram illustrating one example of adjusting a depth of an image captured through a front camera in a mobile terminal according to one embodiment of the present invention. In addition, as mentioned in the foregoing description with reference to FIG. 25, an embodiment shown in FIG. 27 assumes that a plurality of images differing from each other in aperture value are captured through a front camera of a mobile terminal. Secondly, as mentioned in the foregoing description with reference to FIG. 25, an embodiment shown in FIG. 27 assumes that sharpness region information on a plurality of the images is extracted and saved.

Referring to FIG. 27 (*a*), while a gallery application is executing, a mobile terminal can output a first output image 20 captured. The first output image 20 may correspond to an image in which focusing region is set for objects located closest to the mobile terminal. The first output image 20 may correspond to an image captured by focusing on a primary object in a view angle area. The mobile terminal can sense an input signal 2720 for a target object 2710 located in an out-focusing region. For instance, the input signal 2720 may correspond to a touch input of applying a preset pressure or a touch input sensed from a preset area.

In this instance, the mobile terminal can extract an image in which sharpness of the target object 2710 is high from the saved sharpness region information. The mobile terminal extracts a focusing object 2730 of the target object 2720 from the extracted image and can create a second image 2750 by synthesizing the extracted focusing object 2730 with the first image 2710. The focusing object 2730 of the target object 2720 enables the target object 2720, which is not clear due to being unfocused in the first output image 20, to be represented as a focused object in another output image. Moreover, referring to FIG. 27 (*b*), the mobile terminal can output the second image 2740 to the display unit. Meanwhile, if the second image 2740 is created, it can be saved to the mobile terminal.

Figure 28:
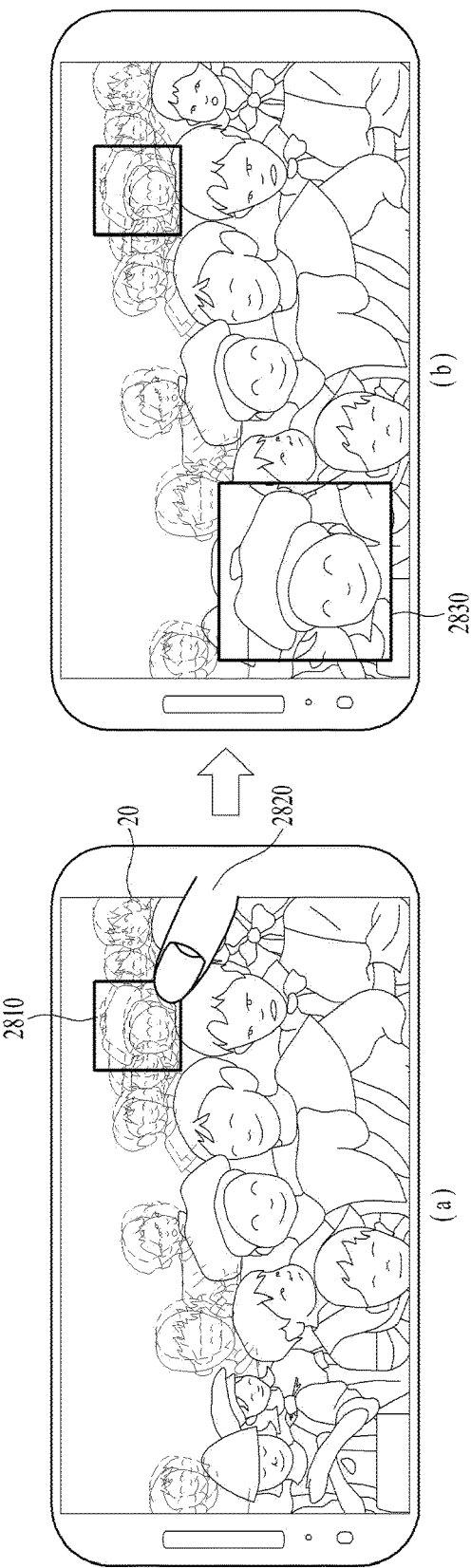
FIG. 28 is a diagram illustrating one example of adjusting depth of an image captured through a front camera in a mobile terminal according to one embodiment of the present invention.

FIG. 28 is a diagram illustrating one example of adjusting a depth of an image captured through a front camera in a mobile terminal according to one embodiment of the present invention. In addition, as mentioned in the foregoing description with reference to FIG. 25, an embodiment shown in FIG. 28 assumes that a plurality of images differing from each other in aperture value are captured through a front camera of a mobile terminal. Secondly, as mentioned in the foregoing description with reference to FIG. 25, an embodiment shown in FIG. 28 assumes that sharpness region information on a plurality of the images is extracted and saved.

Referring to FIG. 28 (*a*), while a gallery application is executing, a mobile terminal can output an output image 20 captured. The output image 20 may correspond to an image in which focusing region is set for objects located closest to the mobile terminal. Further, the mobile terminal can sense an input signal 2820 for a target object 2810 located in an out-focusing region. For instance, the input signal 2820 may correspond to a touch input of applying a preset pressure or a touch input sensed from a preset area.

In this instance, the mobile terminal can extract an image in which sharpness of the target object 2810 is high from the saved sharpness region information. The mobile terminal can extract a focusing object 2840 of the target object 2810 from the extracted image. In this instance, the focusing object is assumed as identical to the former focusing object mentioned with reference to FIG. 27. Referring to FIG. 28 (*b*), while the output image 20 is output, the mobile terminal can output the focusing object in a manner that the focusing object overlays the output image 20 in form of a popup 2830. In this instance, the popup 2830 of the focusing object can be output by being enlarged more than the target object 2810. Through this, a user can check the focusing object before synthesizing it with the output image 20. As a result of the check, if the user applies an input signal for synthesizing the focusing object and the output image 20 together, as shown in FIG. 28 (*b*), the mobile terminal can output the synthesized image.

Synthesis of Near and Remote Objects Sensed by Plurality of Cameras

Figure 29:
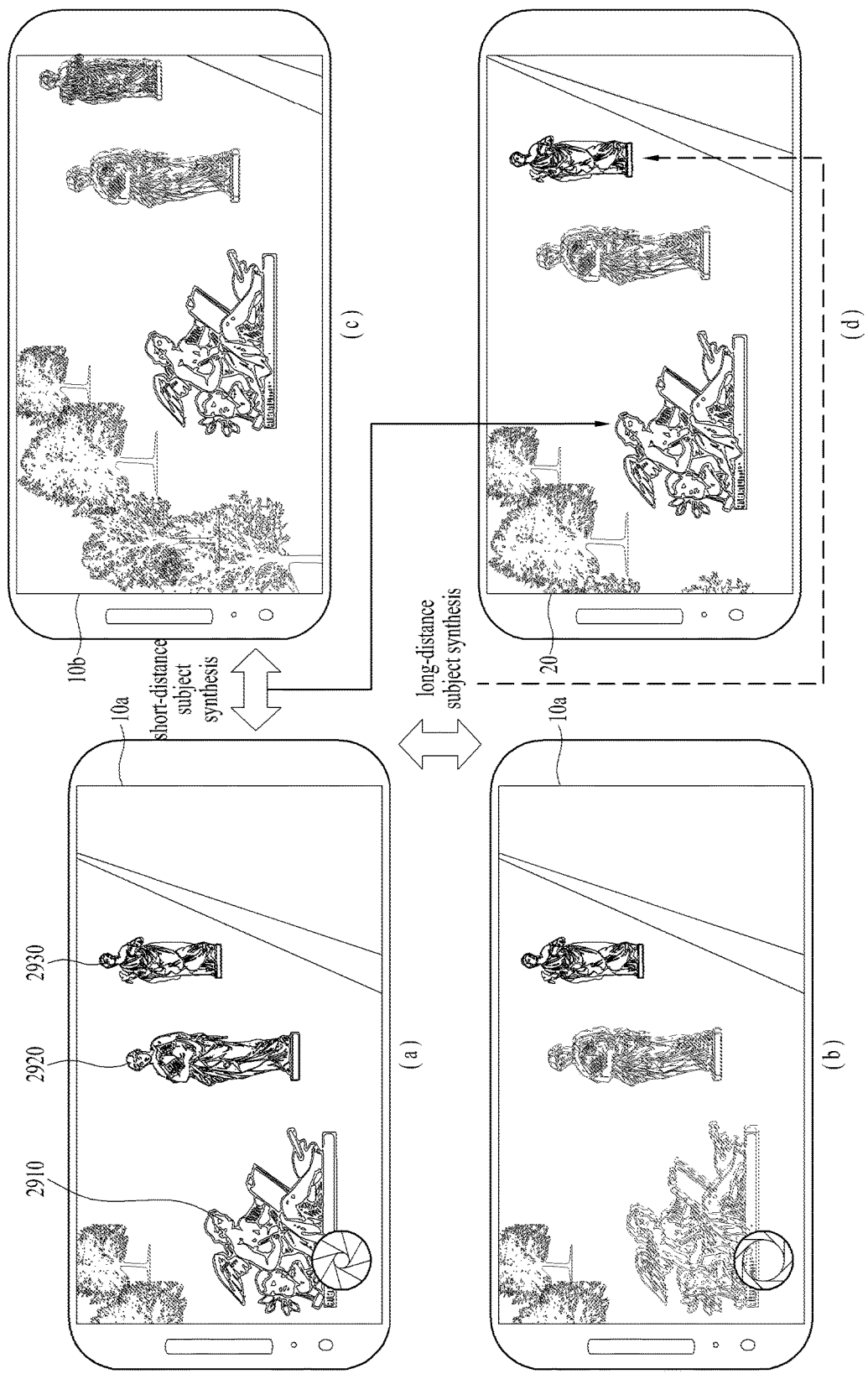
FIG. 29 is a diagram illustrating one example of adjusting depth of an image captured through a front camera in a mobile terminal according to one embodiment of the present invention.

FIG. 29 is a diagram illustrating one example of adjusting a depth of an image captured through a front camera in a mobile terminal according to one embodiment of the present invention. Particularly, FIG. 29 shows a method of outputting a synthesized image by performing not the image segmentation with a single camera, which is mentioned with reference to FIGS. 4 to 7, but the image segmentation through a plurality of cameras provided to a rear side of a mobile terminal. According to the present embodiment, assume that a plurality of the cameras include a first camera and a second camera. Moreover, according to the present embodiment, first to third objects 2910, 2920 and 2930 can be included in a view angle area of each of the first and second cameras. The first object 2910 may correspond to an object nearest to the camera, and the third object 2930 may correspond to an object most remote from the camera.

In addition, if a capture signal is sensed, the mobile terminal can simultaneously capture images through the first and second cameras. For instance, the mobile terminal captures a first image through the first camera by focusing on the third object 2930 and can also capture a second image through the second camera by focusing on the first object 2910. In this instance, the first image captured through the first camera corresponds to an image captured when an aperture value is set relatively high but the second image captured through the second camera corresponds to an image captured when an aperture value is set relatively low. In this instance, referring to FIG. 29 (*a*), in the first image captured through the first camera, not only the third object 2930 but also the rest of the objects can be clearly captured. Moreover, referring to FIG. 29 (b), in the second image captured through the second camera, the first object 2910 in focus can be clearly captured.

In this instance, the mobile terminal can additionally capture a third image through the first camera by changing an aperture value after capturing the first image. For instance, the mobile terminal can additionally capture the third image through the first camera while the third object 2930 is in focus. Further, the third image captured through the first camera corresponds to an image captured when an aperture value is set lowest. In this instance, referring to FIG. 29 (b), only the focused third object 2930 can be clearly captured through the first camera.

Subsequently, the mobile terminal can sense a user input intending to obtain an image in which the first object 2910 and the third object 2930 are in focus. In this instance, as shown in FIG. 29 (d), the mobile terminal can output a fourth image based on the first to third images. Further, the fourth image may correspond to an image blurred except the first object 2910 and the third object 2930.

In particular, the mobile terminal can extract the first object 2910 corresponding to a near object from the first image and the second image by image segmentation. Further, the image segmentation of the first object 2910 may be based on depth map segmentation. Further, the mobile terminal can extract the third object 2930 corresponding to a remote object from the first image and the third image by image segmentation. Further, the image segmentation of the third object 2930 may be based on aperture value adjustment.

Meanwhile, since the first camera and the second camera differ from each other in view angle area, the mobile terminal can perform a step of cropping common regions of the first to third images. Moreover, the mobile terminal can create and output a fourth image by synthesizing the extracted fir and third objects 2910 and 2930 with each other.

Figure 30:
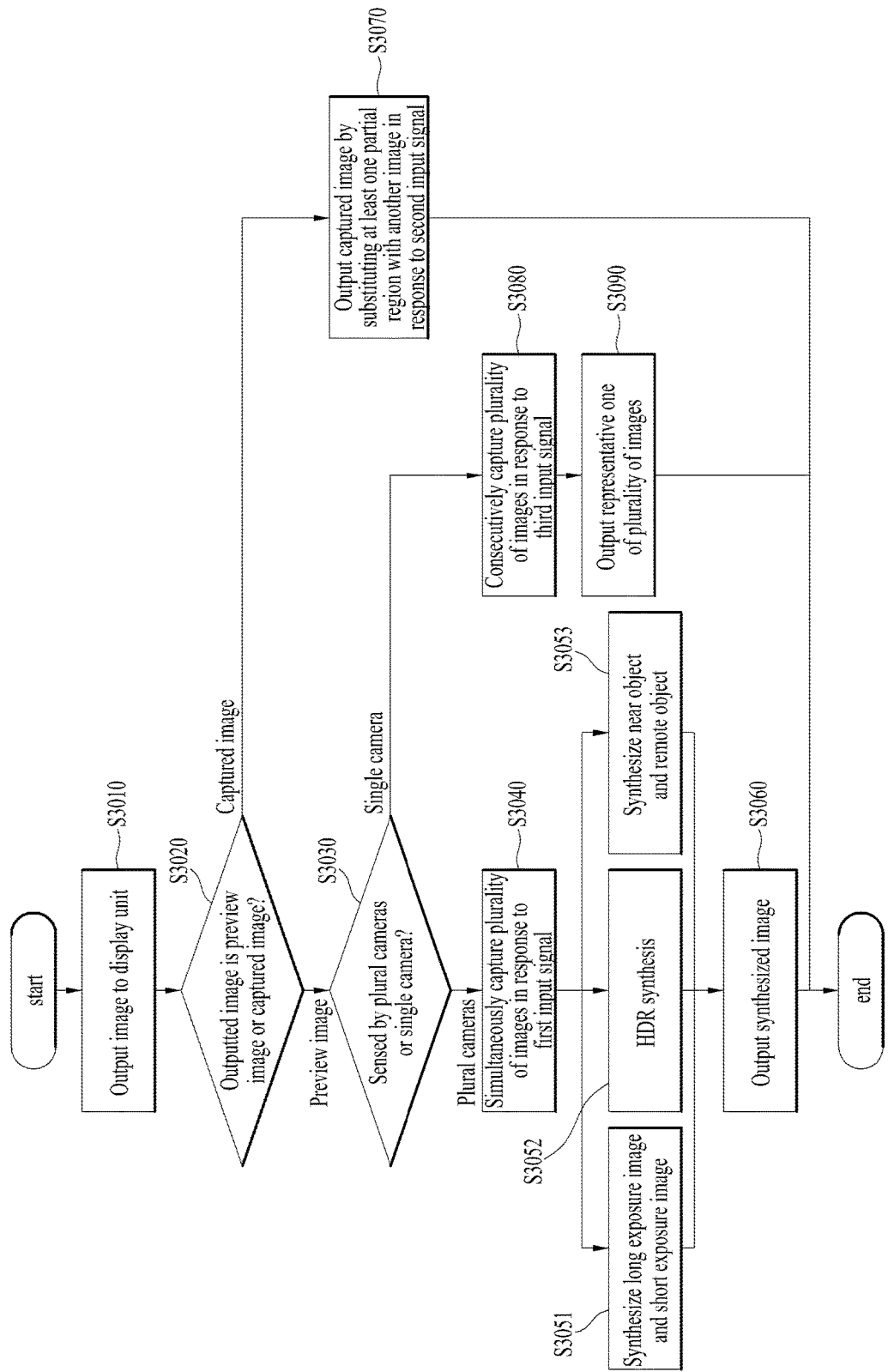
FIG. 30 is flowchart illustrating a method of capturing an image using a camera in a mobile terminal and then correcting the captured image according to one embodiment of the present invention.

FIG. 30 is flowchart illustrating a method of capturing an image using a camera in a mobile terminal and then correcting the captured image according to one embodiment of the present invention. The embodiment shown in FIG. 30 is configured with an embodiment of the present invention only, by which the present invention is non-limited. Further, the present invention can be implemented by further including various user interfaces implementable in a camera of a general mobile terminal.

As shown, a mobile terminal can control an image to be output to a display unit (S3010). The output image may correspond to a preview image sensed by real time through a camera or an image captured through a camera.

The mobile terminal can determine whether the output image corresponds to the preview image or the captured image (S3020). If the output image corresponds to the preview image in the step S3020, the mobile terminal can determine whether a plurality of cameras or a single camera is in activated state (S3030). For instance, the mobile terminal can determine whether the output image is the preview image sensed by a plurality of the cameras or the preview image sensed by the single camera. Regarding this, as mentioned in the foregoing description with reference to FIGS. 14 to 17, the mobile terminal can simultaneously output a plurality of the preview images sensed by a plurality of the cameras.

If a plurality of the cameras are in the activated state in the step S3030, the mobile terminal can simultaneously capture a plurality of images in response to a first input signal (S3040). In this instance, a plurality of the captured images may correspond to images simultaneously captured by being set at different aperture values. Further, view angle ranges of a plurality of the captured images may be different from or identical to each other depending on whether the cameras are narrow angle cameras or wide angle cameras.

For instance, as mentioned in the foregoing description with reference to FIG. 18, the mobile terminal can create a synthetic image by synthesizing a long exposure image and a short exposure image with each other based on a plurality of the captured images (S3051). In another instance, as mentioned in the foregoing description with reference to FIGS. 19 to 23, the mobile terminal can create a synthetic image synthesized by HDR based on a plurality of the captured images (S3052). In another instance, as mentioned in the foregoing description with reference to FIG. 29, the mobile terminal can create a synthetic image by synthesizing a near object and a remote object together based on a plurality of the captured images (S3053).

Thereafter, the mobile terminal can output the synthesized image to the display unit (S3060). For instance, right after an image has been captured, the mobile terminal can output an image synthesized on a camera application to the display unit. In another instance, after an image has been captured, the mobile terminal may output a synthesized image by launching a gallery application.

Meanwhile, if the output image corresponds to the captured image in the step S3020, the mobile terminal can control the captured image to be output in a manner that at least one partial region of the captured image is substituted with a different image in response to a second input signal (S3070). For instance, as mentioned in the foregoing description with reference to FIGS. 8 to 13, the mobile terminal can output an image in which depth of a partial region of an image captured through a camera provided to a rear side of the mobile terminal is changed. In another instance, as mentioned in the foregoing description with reference to FIGS. 24 to 28, the mobile terminal can output an image in which depth of a partial region of an image captured through a camera provided to a front side of the mobile terminal is changed.

Meanwhile, if the single camera is in the activated state in the step S3030, the mobile terminal can consecutively capture a plurality of images in response to a third input signal (S3080). Regarding this, as mentioned in the foregoing description with reference to FIGS. 4 to 7, the mobile terminal can consecutively capture a plurality of images differing from each other in aperture value for the same view angle area through the single camera.

Subsequently, the mobile terminal can output a representative image among a plurality of the images to the display unit (S3090). For instance, the mobile terminal can output the representative image to the display unit on the camera application right after capturing the images. In another instance, after the images have been captured, the mobile terminal can output the representative image to the display unit by launching a gallery application.

Accordingly, embodiments of the present invention provide several advantages. According to at least one of embodiments of the present invention, through artificial blurring by a digital aperture value, the mobile terminal can provide an effect similar to that of an image captured by such a camera equipped with a large lens aperture as DSLR camera.

According to at least one of embodiments of the present invention, based on a plurality of images captured on photographing, a user can perform post-correction on an output image intuitively and easily through such an input to the output image as a drag touch, a long & press touch or the like. According to at least one of embodiments of the present invention, with a single shot, both a dynamic object and a static object can be clearly provided within a single image.

According to at least one of embodiments of the present invention, in case of performing HDR synthesis based on a plurality of images captured at the same timing, since an object sensed within a view angle area is maintained identically, it can provide HDR image synthesized more accurately.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal. The foregoing embodiments are merely exemplary and are not to be considered as limiting the present disclosure.

The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments. As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal, comprising:
   at least first and second cameras,
   a display; and
   a controller configured to:
   display a first image including a focusing region and an out-focusing region on the display, wherein a depth of the first image corresponds to a first depth,
   extract an image among at least one image related to the first image, wherein a depth of the extracted image corresponds to a second depth,
   create a second image by synthesizing a selected specific region of the extracted image with the first image, wherein the selected region is in the out-focusing region,
   display the second image in response to a first input signal,
   capture the first image obtained through the first camera and a third image obtained through the second camera in response to a second input signal,
   create a fourth image based on a static object included in the first image and a dynamic object included in the third image, and
   display the fourth image based on the first image and the third image,
   wherein the first image comprises an image captured during an exposure time over a preset time and the third image comprises an image captured during an exposure time within the preset time.

2. The mobile terminal of claim 1, wherein the first input signal corresponds to the selection of the specific region in the out-focusing region.

3. The mobile terminal of claim 2, wherein the controller is further configured to determine the second depth based on at least one of a pressure of the first input signal and a count of the first input signal.

4. The mobile terminal of claim 2, wherein the controller is further configured to display a pop-up message on the display indicating the selected region, in response to a second input signal for the selected region.

5. The mobile terminal of claim 1, wherein the controller is further configured to:
   crop common regions of the first image and the third image, and
   display the fourth image based on the cropped first image and the cropped third image.

6. The mobile terminal of claim 1, wherein the fourth image comprises an image HDR (high dynamic range) synthesized based on the first image and the third image.

7. The mobile terminal of claim 1, wherein the controller is further configured to capture a plurality of images corresponding to a view angle area of the first camera consecutively in response to a second input signal.

8. The mobile terminal of claim 7, wherein the controller is further configured to:
   display a preview image corresponding to the first image and an aperture control bar on the display, and
   change the first depth of the preview image into a third depth in response to an input signal of the aperture control bar.

9. The mobile terminal of claim 8, wherein if the third depth corresponds to a depth range failing to be supported by the first camera, the controller is further configured to display the preview image by changing the preview image into a blurred image.

10. The mobile terminal of claim 9, wherein the controller is further configured to create and save an output image corresponding to the third depth based on the plurality of the images.

11. The mobile terminal of claim 1, wherein if the first image corresponds to a plurality of preview images, the controller is further configured to capture either a first preview image through the first camera or a second preview image through the second camera in response to a second input signal.

12. The mobile terminal of claim 11, wherein the controller is further configured to output locations of the plurality of the preview images on the display based on a direction of motion of an object sensed by at least one of the first camera and the second camera.

13. A method for focusing, comprising:
   A method of controlling a mobile terminal, the method comprising:
   displaying, via a display of the mobile terminal, a first image including a focusing region and an out-focusing region, wherein a depth of the first image corresponds to a first depth;
   extracting an image among at least one image related to the first image, wherein a depth of the extracted image corresponds to a second depth;

creating a second image by synthesizing a selected specific region of the extracted image with the first image, wherein the selected region is in the out-focusing region; and displaying, via the display, the second image in response to a first input signal; capturing the first image obtained through a first camera and a third image obtained through a second camera in response to a second input signal;

creating a fourth image based on a static object included in the first image and a dynamic object included in the third image; and displaying the fourth image based on the first image and the third image, wherein the first image comprises an image captured during an exposure time over a preset time and the third image comprises an image captured during an exposure time within the preset time.

14. The method of claim 13, wherein the first input signal corresponds to the selection of the specific region in the out-focusing region.

* * * * *